US011257363B2

(12) United States Patent
Wang et al.

(10) Patent No.: US 11,257,363 B2
(45) Date of Patent: Feb. 22, 2022

(54) XR-BASED SLOT RESERVATION SYSTEM FOR CONNECTED VEHICLES TRAVELING THROUGH INTERSECTIONS

(71) Applicant: TOYOTA JIDOSHA KABUSHIKI KAISHA, Toyota (JP)

(72) Inventors: Ziran Wang, Mountain View, CA (US); Kyungtae Han, Mountain View, CA (US); BaekGyu Kim, Mountain View, CA (US)

(*) Notice: Subject to any disclaimer, the term of this patent is extended or adjusted under 35 U.S.C. 154(b) by 198 days.

(21) Appl. No.: 16/264,475

(22) Filed: Jan. 31, 2019

(65) Prior Publication Data
US 2020/0250969 A1    Aug. 6, 2020

(51) Int. Cl.
| G08G 1/01 | (2006.01) |
| G01C 21/36 | (2006.01) |
| G08G 1/00 | (2006.01) |
| H04W 4/40 | (2018.01) |
| G08G 1/16 | (2006.01) |

(52) U.S. Cl.
CPC .......... *G08G 1/0145* (2013.01); *G01C 21/365* (2013.01); *G08G 1/0116* (2013.01); *G08G 1/164* (2013.01); *G08G 1/22* (2013.01); *H04W 4/40* (2018.02)

(58) Field of Classification Search
CPC .... G08G 1/0145; G08G 1/0116; G08G 1/164; G08G 1/167; G08G 1/22; H04W 4/40; H04W 4/46; G01C 21/365
See application file for complete search history.

(56) References Cited

U.S. PATENT DOCUMENTS

| 10,607,416 | B2* | 3/2020 | Nowakowski | ........... G08G 1/22 |
| 10,836,313 | B2* | 11/2020 | Nowakowski | ............ B60R 1/00 |
| 2018/0101736 | A1* | 4/2018 | Han | ........................ G08G 1/166 |
| 2019/0340876 | A1* | 11/2019 | Northrup | ................ H04L 63/08 |
| 2020/0086789 | A1* | 3/2020 | Nowakowski | ........ G06T 15/503 |
| 2020/0191952 | A1* | 6/2020 | Makinen | ........... B60W 30/0953 |
| 2020/0258480 | A1* | 8/2020 | Bronder | ................... G09G 5/38 |

* cited by examiner

*Primary Examiner* — Ig T An
(74) *Attorney, Agent, or Firm* — Burbage Law, P.C.; Jon-Michael Burbage; Elizabeth Ruzich

(57) ABSTRACT

The disclosure includes embodiments for using cross reality (XR) technologies to improve safety of a first endpoint that travels through an intersection. In some embodiments, a method for the first endpoint includes receiving first sensor data from one or more sensors of the first endpoint. The method includes determining that the first endpoint approaches an intersection based on the first sensor data. The method includes generating, based on the first sensor data, XR data that is operable to generate a graphical overlay for presenting a safe zone that the first endpoint stays within while approaching the intersection to improve safety of the first endpoint. The method includes providing the XR data to an XR viewing device to modify an operation of the XR viewing device so that the XR viewing device presents the safe zone on the graphical overlay.

20 Claims, 14 Drawing Sheets

XR-BASED SLOT RESERVATION SYSTEM FOR CONNECTED VEHICLES TRAVELING THROUGH INTERSECTIONS

BACKGROUND

The specification relates to using Cross Reality (XR) technologies to improve safety of various endpoints that travel through intersections. For example, this specification relates to XR technology to improve the safety of a connected vehicle traveling through an intersection.

Roadway systems include roadway intersections. Roadway intersections are difficult to manage. For simplicity, a roadway intersection is referred to herein as an "intersection." The risk of a collision is higher than usual when a "road participant" is approaching an intersection.

A road participant is an object that interacts with an intersection. For example, a road participant includes one or more of the following: a vehicle (e.g., whether the vehicle is autonomous or operated by a driver); a motorcycle; a biker; a pedestrian; an animal (e.g., a dog or cat); etc.

Intersections are difficult to manage for road participants for many reasons. For example, an "ego road participant" may face a complicated traffic situation when approaching an intersection. The complicated traffic situation may involve various other "remote road participants" traveling in many different directions. Some of these road participants may be traveling in the same heading as the ego road participant, or in a different heading relative to the ego road participant. Different remote road participants may have different behaviors at the intersection. All of these variables, as well as their cumulative and individual complication and unpredictability, make managing the intersection more difficult for the ego road participant (or the ego road participant's driver).

SUMMARY

Described are embodiments of an XR system installed in an electronic control unit (ECU) of a first endpoint. The XR system is operable to use XR technologies to improve safety of the first endpoint (as well as other endpoints) that travels through an intersection.

In some embodiments, the first endpoint can be a vehicle. For example, the first endpoint can be a vehicle operated by a driver, and the driver may need assistance to know where the vehicle should be as it approaches the intersection in order to minimize a risk of collision. In another example, the first endpoint can be an autonomous vehicle, and then the driver still may want to understand what to expect about the vehicle's future behavior as it approaches the intersection. The XR system described herein is capable of helping the driver to either: (1) know how best to position his/her vehicle as it approaches an intersection; or (2) understand the future behavior of his/her autonomous vehicle as it approaches an intersection. As used herein, the term "vehicle" may refer to a connected vehicle having the ability to send and receive wireless messages via a wireless network.

In some embodiments, the XR system may utilize one or more of the following technologies: Augmented Reality (AR), Virtual Reality (VR) and Mixed Reality (MR). The XR system includes software installed in an electronic control unit (ECU) of an ego vehicle. The XR system receives Vehicle-to-Everything (V2X) wireless messages from remote vehicles and other connected roadway infrastructure devices. The XR system analyzes the V2X wireless messages to determine which of these vehicles are approaching an intersection and their locations, both current locations and future locations, as they approach the intersection.

In some embodiments, the XR system adaptively determines a safe zone that the ego vehicle may stay within while approaching the intersection to avoid collision and a reserved slot within the safe zone that is reserved for the ego vehicle. For example, the remote vehicles may communicate positions of their reserved slots to the XR system of the ego vehicle (e.g., if the remote vehicles include their own instance of the XR system, which is not a requirement herein), the XR system of the ego vehicle may determine a reserved slot in the safe zone for the ego vehicle based on the positions of the reserved slots for the remote vehicles. A position of this reserved slot of the ego vehicle may be communicated to the remote vehicles. The XR system generates graphical data for displaying an overlay transparently depicting the reserved slot of the ego vehicle on an XR viewing device (e.g., a Heads-Up Display (HUD) unit or some other XR viewing device). The XR system causes the XR viewing device to display the overlay on the XR viewing device.

In some embodiments, the safe zone and the reserved slot of the ego vehicle are color-coded within the overlay so that they are easily and intuitively understood by the driver of the ego vehicle.

In some embodiments, the XR system controls an operation of an Advanced Driver Assistance System (ADAS system) of the ego vehicle to cause the ego vehicle to stay within the safe zone or the reserved slot when approaching the intersection for a period of time that is operable to optimize safety and reduce collisions.

In some embodiments, the safe zone (e.g., a region of the safe zone) or the reserved slot (e.g., a location of the reserved slot) changes over time. The XR system modifies an operation of the ADAS system to cause the ego vehicle to stay within the time-varying safe zone or the time-varying reserved slot when traveling through the intersection.

The XR system provided herein is beneficial for either a traditional vehicle that is operated by a driver or an autonomous vehicle. The driver may be informed with a safe zone and a reserved slot within the safe zone where the vehicle can stay while approaching an intersection to avoid collisions. By comparison, there is no existing solution that uses XR technologies in a vehicle to make a driver aware of a safe zone for the vehicle to be located in and a reserved slot for the vehicle to be located in.

A system of one or more computers can be configured to perform particular operations or actions by virtue of having software, firmware, hardware, or a combination of them installed on the system that in operation causes the system to perform the actions. One or more computer programs can be configured to perform particular operations or actions by virtue of including instructions that, when executed by data processing apparatus, cause the apparatus to perform the actions.

One general aspect includes a method for a first endpoint, including: receiving first sensor data from one or more sensors of the first endpoint; determining that the first endpoint approaches an intersection based on the first sensor data; generating, based on the first sensor data, XR data that is operable to generate a graphical overlay for presenting a safe zone that the first endpoint stays within while approaching the intersection to improve safety of the first endpoint; and providing the XR data to an XR viewing device to modify an operation of the XR viewing device so that the XR viewing device presents the safe zone on the graphical overlay. Other embodiments of this aspect include corresponding computer systems, apparatus, and computer programs recorded on one or more computer storage devices, each configured to perform the actions of the methods.

In some embodiments, XR data is configured to generate the graphical overlay because it includes digital data that is operable to cause the XR viewing device to display the graphical overlay that depicts, for example, the safe zone for the first endpoint to stay within while approaching the intersection. This is beneficial in some embodiments, for example, because if the first endpoint is operated (or operates itself) so that the first endpoint stays within this safe zone then the safety of the first endpoint, as well as the safety of other endpoints, is improved because a collision involving the first endpoint is reduced.

Implementations may include one or more of the following features. The method where determining that the first endpoint approaches the intersection includes: receiving one or more of location data describing a location of the first endpoint and map data describing a map of a roadway environment of the first endpoint; and determining that the first endpoint approaches the intersection based on one or more of the first sensor data, the location data and the map data. The method where the XR data is further configured to generate the graphical overlay for presenting first slot data describing a first reserved slot within the safe zone that is reserved for the first endpoint. The method where one or more of the safe zone and the first reserved slot for the first endpoint change over time while the first endpoint travels through the intersection. The method where generating the XR data includes: receiving a V2X wireless message from a second endpoint, where the V2X wireless message includes V2X data of the second endpoint including one or more of second sensor data recorded by one or more sensors of the second endpoint and second slot data describing a second reserved slot for the second endpoint; receiving one or more of location data describing a location of the first endpoint and map data describing a map of a roadway environment of the first endpoint; and generating the XR data based on one or more of the first sensor data of the first endpoint, the location data of the first endpoint, the map data, the second sensor data of the second endpoint and the second slot data of the second endpoint. The method where generating the XR data further includes: analyzing the V2X data to determine that the second endpoint also approaches the intersection; determining the safe zone and the first reserved slot within the safe zone for the first endpoint to avoid a collision with the second endpoint based on one or more of the first sensor data of the first endpoint, the location data of the first endpoint, the map data, the second sensor data of the second endpoint and the second slot data of the second endpoint; and generating the XR data that is operable to generate the graphical overlay for presenting the safe zone and the first reserved slot. The method where the first endpoint includes an ADAS system. The method further including: generating ADAS function data based on one or more of the first sensor data of the first endpoint, the second sensor data of the second endpoint, the second slot data of the second endpoint and the first slot data of the first endpoint, where the ADAS function data includes digital data describing one or more settings for the ADAS system while the first endpoint travels through the intersection; and providing the ADAS function data to the ADAS system to modify an operation of the ADAS system so that the ADAS system controls the first endpoint to stay within the safe zone or the first reserved slot within the safe zone while approaching the intersection for a period of time that is operable to optimize the safety of the first endpoint. The method where the safe zone and the first reserved slot are color-coded within the graphical overlay to facilitate a recognition of the safe zone and the first reserved slot by a user of the first endpoint. Implementations of the described techniques may include hardware, a method or process, or computer software on a computer-accessible medium.

One general aspect includes a system including an onboard computer system of a first endpoint including a non-transitory memory storing computer code which, when executed by the onboard computer system, causes the onboard computer system to: receive first sensor data from one or more sensors of the first endpoint; determine that the first endpoint approaches an intersection based on the first sensor data; generate, based on the first sensor data, XR data that is operable to generate a graphical overlay for presenting a safe zone that the first endpoint stays within while approaching the intersection to improve safety of the first endpoint; and provide the XR data to an XR viewing device to modify an operation of the XR viewing device so that the XR viewing device presents the safe zone on the graphical overlay. Other embodiments of this aspect include corresponding computer systems, apparatus, and computer programs recorded on one or more computer storage devices, each configured to perform the actions of the methods.

Implementations may include one or more of the following features. The system where the computer code, when executed by the onboard computer system, causes the onboard computer system to determine that the first endpoint approaches the intersection at least by: receiving one or more of location data describing a location of the first endpoint and map data describing a map of a roadway environment of the first endpoint; and determining that the first endpoint approaches the intersection based on one or more of the first sensor data, the location data and the map data. The system where the XR data is further configured to generate the graphical overlay for presenting first slot data describing a first reserved slot within the safe zone that is reserved for the first endpoint. The system where one or more of the safe zone and the first reserved slot for the first endpoint change over time while the first endpoint travels through the intersection. The system where the computer code, when executed by the onboard computer system, causes the onboard computer system to generate the XR data at least by: receiving a V2X wireless message from a second endpoint, where the V2X wireless message includes V2X data of the second endpoint including one or more of second sensor data recorded by one or more sensors of the second endpoint and second slot data describing a second reserved slot for the second endpoint; receiving one or more of location data describing a location of the first endpoint and map data describing a map of a roadway environment of the first endpoint; and generating the XR data based on one or more of the first sensor data of the first endpoint, the location data of the first endpoint, the map data, the second sensor data of the second endpoint and the second slot data of the second endpoint. The system where the computer code, when executed by the onboard computer system, causes the onboard computer system to generate the XR data at least by: analyzing the V2X data to determine that the second endpoint also approaches the intersection; determining the safe zone and the first reserved slot within the safe zone for the first endpoint to avoid a collision with the second endpoint based on one or more of the first sensor data of the first endpoint, the location data of the first endpoint, the map data, the second sensor data of the second endpoint and the second slot data of the second endpoint; and generating the XR data that is operable to generate the graphical overlay for presenting the safe zone and the first reserved slot. The system where the first endpoint includes an ADAS system. The system where the computer code, when executed by the onboard computer system, causes the onboard computer system further to: generate ADAS function data based on one or more of the first sensor data of the first endpoint, the second sensor data of the second endpoint, the second slot data of the second endpoint and the first slot data of the first endpoint, where the ADAS function data includes digital data describing one or more settings for the ADAS system while the first endpoint travels through the intersection; and provide the ADAS function data to the ADAS system to modify an operation of the ADAS system so that the ADAS system controls the first endpoint to stay within the safe zone or the first reserved slot within the safe zone while approaching the intersection for a period of time that is operable to optimize the safety of the first endpoint. The system where the safe zone and the first reserved slot are color-coded within the graphical overlay to facilitate a recognition of the safe zone and the first reserved slot by a user of the first endpoint. Implementations of the described techniques may include hardware, a method or process, or computer software on a computer-accessible medium.

One general aspect includes a computer program product including a non-transitory memory of an onboard computer system of a first endpoint storing computer-executable code that, when executed by a processor, causes the processor to: receive first sensor data from one or more sensors of the first endpoint; determine that the first endpoint approaches an intersection based on the first sensor data; generate, based on the first sensor data, XR data that is operable to generate a graphical overlay for presenting a safe zone that the first endpoint stays within while approaching the intersection to improve safety of the first endpoint; and provide the XR data to an XR viewing device to modify an operation of the XR viewing device so that the XR viewing device presents the safe zone on the graphical overlay. Other embodiments of this aspect include corresponding computer systems, apparatus, and computer programs recorded on one or more computer storage devices, each configured to perform the actions of the methods.

Implementations may include one or more of the following features. The computer program product where the XR data is further configured to generate the graphical overlay for presenting first slot data describing a first reserved slot within the safe zone that is reserved for the first endpoint. The computer program product where the computer-executable code, when executed by the processor, causes the processor to generate the XR data at least by: receiving a V2X wireless message from a second endpoint, where the V2X wireless message includes V2X data of the second endpoint including one or more of second sensor data recorded by one or more sensors of the second endpoint and second slot data describing a second reserved slot for the second endpoint; receiving one or more of location data describing a location of the first endpoint and map data describing a map of a roadway environment of the first endpoint; and generating the XR data based on one or more of the first sensor data of the first endpoint, the location data of the first endpoint, the map data, the second sensor data of the second endpoint and the second slot data of the second endpoint. The computer program product where the first endpoint includes an ADAS system. The computer program product where the computer-executable code, when executed by the processor, causes the processor further to: generate ADAS function data based on one or more of the first sensor data of the first endpoint, the second sensor data of the second endpoint, the second slot data of the second endpoint and the first slot data of the first endpoint, where the ADAS function data includes digital data describing one or more settings for the ADAS system while the first endpoint travels through the intersection; and provide the ADAS function data to the ADAS system to modify an operation of the ADAS system so that the ADAS system controls the first endpoint to stay within the safe zone or the first reserved slot within the safe zone while approaching the intersection for a period of time that is operable to optimize the safety of the first endpoint. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 5A:
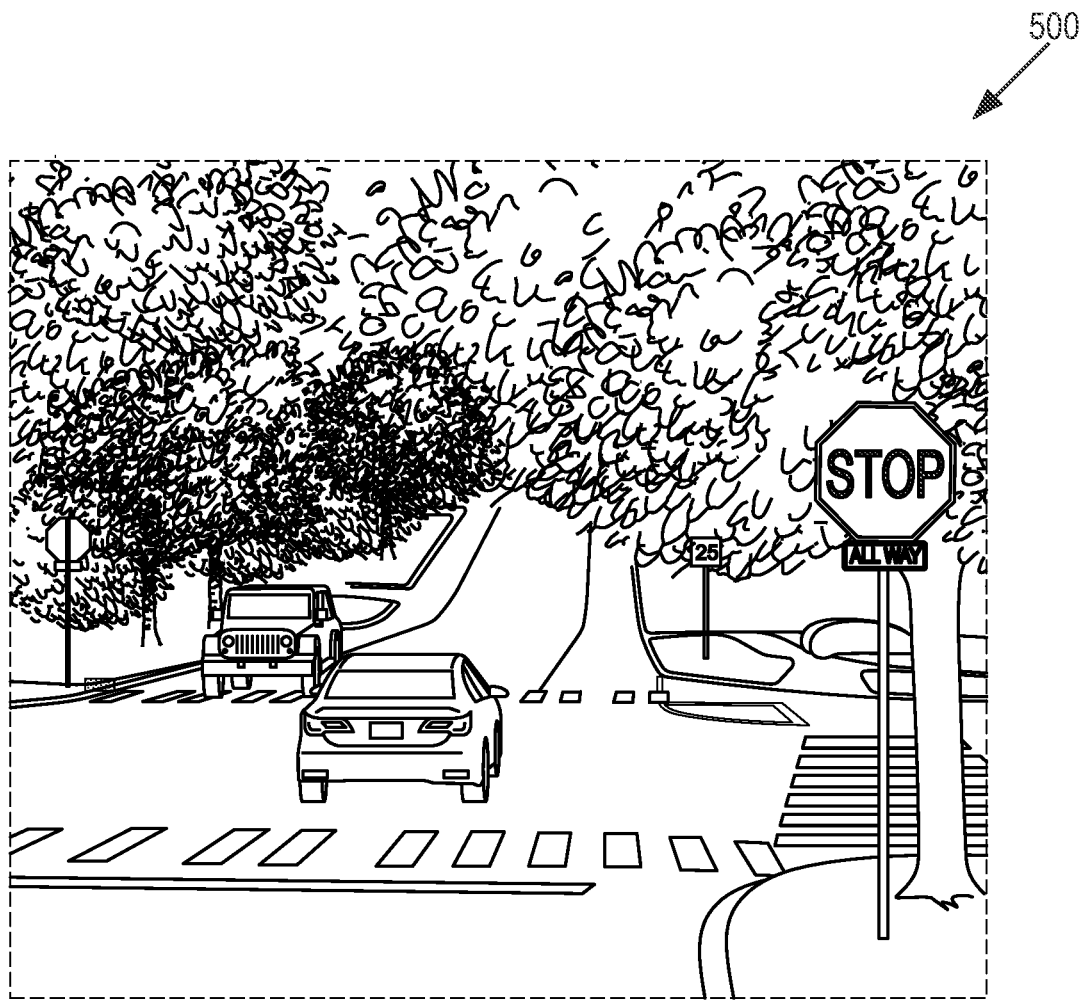
FIGS. 5A-5B are graphical representations illustrating different types of intersections according to some embodiments.
Figure 5B:
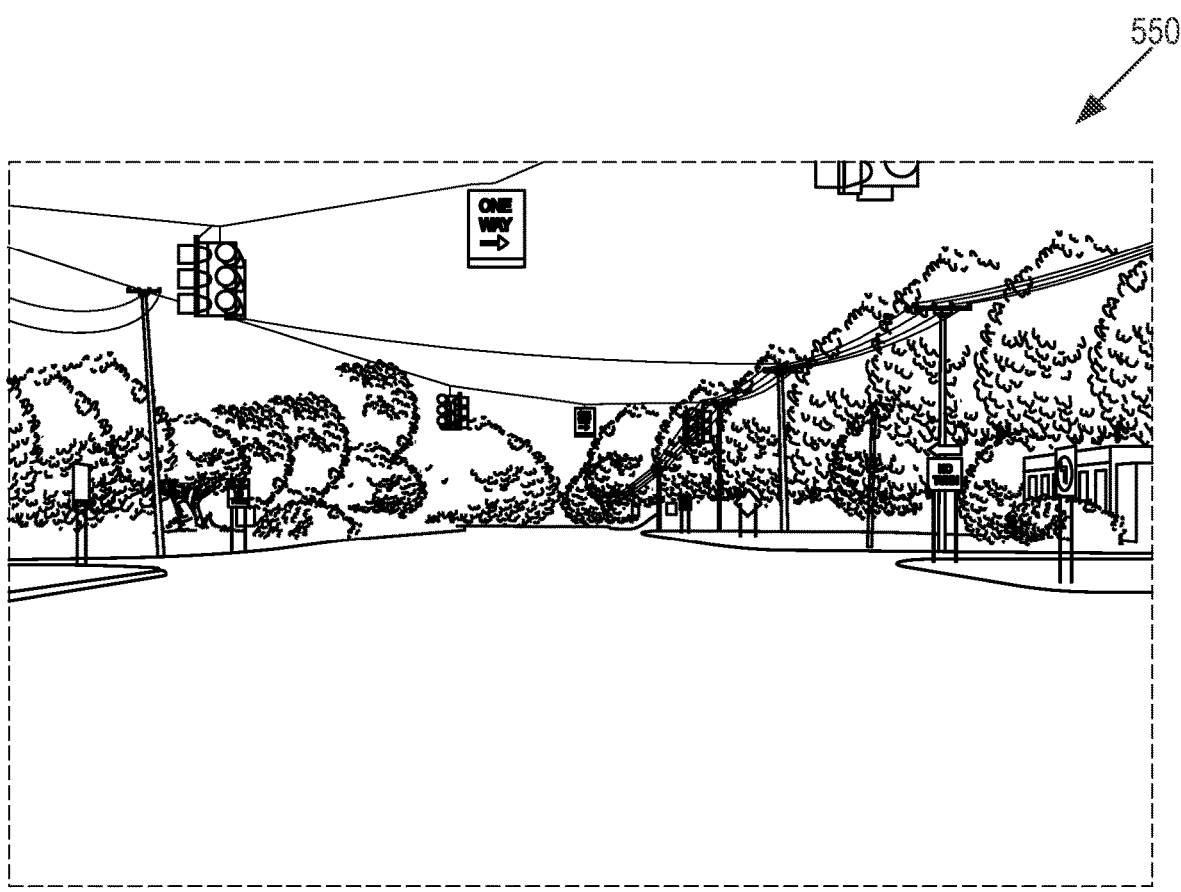

Embodiments of an XR system are described herein that use XR technologies to improve safety of a first endpoint (as well as other endpoints) that travels through an intersection. The XR system can be applied for different types of intersections, including but not limited to, a stop-sign based intersection (e.g., an intersection with stop signs as shown in FIG. 5A), a signalized intersection (e.g., an intersection with traffic lights as shown in FIG. 5B) and any other types of intersections.

At a stop-sign based intersection, a driver of a vehicle may sometimes neglect a stop sign at the intersection and collide with other vehicles that cross the intersection, which makes the travel through the intersection unsafe for both the vehicle and the other vehicles. Usually, the vehicle has to stop at the stop sign even if there is no vehicle and pedestrian crossing the intersection, which makes the driving experience safer but inefficient.

At a signalized intersection, a driver of a vehicle operates the vehicle according to the traffic lights at the intersection, and usually the driver has very limited knowledge about the timing information about the traffic signals, which makes the driving experience inefficient.

The XR system described herein may utilize one or more of the following technologies: Augmented Reality (AR), Virtual Reality (VR) and Mixed Reality (MR), to improve safety and driving experiences of vehicles (as well as safety of other endpoints) that travel through the various types of intersections.

In some embodiments, the first endpoint is an ego vehicle, and the XR system includes software installed in an electronic control unit of the ego vehicle. The XR system receives V2X wireless messages via any form of V2X communications from remote vehicles and other connected roadway infrastructure devices. The XR system analyzes the V2X wireless messages to determine which of these vehicles are approaching an intersection and their locations (e.g., both current locations and future locations) as they approach the intersection. The XR system adaptively determines a safe zone that the ego vehicle may stay within while approaching the intersection to avoid collision with the remote vehicles based on, for example, an analysis of the V2X wireless messages. The XR system also determines a reserved slot within the safe zone that is reserved for the ego vehicle. In some embodiments, a region of the safe zone or a location of the reserved slot changes over time.

In some embodiments, V2X cooperation is performed among different XR systems installed in different vehicles. For example, the location of the reserved slot for the ego vehicle may be communicated to the remote vehicles via any form of V2X communications. In some embodiments, the remote vehicles also include instances of the XR system. If so, then the XR systems of the remote vehicles determine reserved slots for the remote vehicles, and digital data describing this information may be communicated to the ego vehicle using any form of V2X communications. Accordingly, in some embodiments the XR system of the ego vehicle may determine the reserved slot for the ego vehicle based in part on the reserved slots for the remote vehicles.

The XR system generates graphical data for displaying an overlay transparently depicting the reserved slot of the ego vehicle on an XR viewing device (e.g., a Heads-Up Display (HUD) unit or some other XR viewing device). The XR system causes the XR viewing device to display the overlay on the XR viewing device. In some embodiments, the safe zone and the reserved slot are color-coded within the overlay so that they are easily and intuitively understood by the driver of the ego vehicle.

In some embodiments, the ego vehicle includes an ADAS system, and the XR system controls an operation of the ADAS system to cause the ego vehicle to stay within the safe zone or the reserved slot when approaching the intersection for a period of time that is operable to optimize safety and reduce collisions.

In some embodiments, a vehicle that includes the XR system is a DSRC-equipped vehicle. A DSRC-equipped vehicle is a vehicle which: (1) includes a DSRC radio; (2) includes a DSRC-compliant Global Positioning System (GPS) unit; and (3) is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages.

A DSRC-compliant GPS unit is operable to provide positional information for a vehicle (or some other DSRC-equipped device that includes the DSRC-compliant GPS unit) that has lane-level accuracy. In some embodiments, a DSRC-compliant GPS unit is operable to identify, monitor and track its two-dimensional position within 1.5 meters of its actual position 68% of the time under an open sky.

A conventional GPS unit provides positional information that describes a position of the conventional GPS unit with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in on a roadway. Some safety or autonomous driving applications provided by the ADAS system of a modern vehicle require positioning information that describes the geographic position of the vehicle with lane-level accuracy. In addition, the current standard for DSRC requires that the geographic position of the vehicle be described with lane-level accuracy.

In some embodiments, devices other than vehicles (e.g., an endpoint that is not a vehicle) may be DSRC-equipped. These DSRC-equipped devices may be used to relay data to the vehicle via a DSRC message. For example, an RSU or any other communication device may be DSRC-equipped if it includes one or more of the following elements: a DSRC transceiver and any software or hardware necessary to encode and transmit a DSRC message; and a DSRC receiver and any software or hardware necessary to receive and decode a DSRC message.

The embodiments described herein may use V2X communications to transmit and receive wireless messages. As described herein, examples of V2X communications include, but are not limited to, one or more of the following: Dedicated Short Range Communication (DSRC) (including Basic Safety Messages (BSMs) and Personal Safety Messages (PSMs), among other types of DSRC communication); Long-Term Evolution (LTE); millimeter wave (mmWave) communication; 3G; 4G; 5G; LTE-V2X; 5G-V2X; LTE-Vehicle-to-Vehicle (LTE-V2V); LTE-Device-to-Device (LTE-D2D); Voice over LTE (VoLTE); etc. In some examples, the V2X communications can include V2V communications, Vehicle-to-Infrastructure (V2I) communications, Vehicle-to-Network (V2N) communications or any combination thereof.

Examples of a wireless message (e.g., a V2X wireless message) described herein include, but are not limited to, the following messages: a Dedicated Short Range Communication (DSRC) message; a Basic Safety Message (BSM); a Long-Term Evolution (LTE) message; a LTE-V2X message (e.g., a LTE-Vehicle-to-Vehicle (LTE-V2V) message, a LTE-Vehicle-to-Infrastructure (LTE-V2I) message, an LTE-V2N message, etc.); a 5G-V2X message; and a millimeter wave message, etc.

A BSM includes BSM data. The BSM data describes attributes of the vehicle that originally transmitted the BSM. The BSM data describes, among other things, one or more of the following: (1) the path history of the vehicle that transmits the BSM; (2) the speed of the vehicle that transmits the BSM; and (3) the GPS data describing a location of the vehicle that transmits the BSM.

In some embodiments, DSRC-equipped vehicles may probe other DSRC-equipped vehicles/devices along the roadway for information describing their current and future conditions, including their path history, future path, and sensor data they may have received or generated. This information is described as "DSRC probe data." DSRC probe data may include any data received via a DSRC probe or responsive to a DSRC probe.

A DSRC message may include DSRC-based data. The DSRC-based data may include BSM data or DSRC probe data. In some embodiments, the DSRC-based data included in a DSRC message may include BSM data or DSRC probe data received from a plurality of DSRC-equipped vehicles (or other DSRC-equipped devices or endpoints). This BSM data or DSRC probe data may include an identifier of its source and the location of the source or any traffic events described by the BSM data or DSRC probe data.

The BSM data or DSRC probe data may specify which lane a vehicle is traveling in as well as its speed of travel and path history. The BSM data or DSRC probe data may further specify one or more of the following: a velocity of the vehicle at one or more different times or one or more different locations; a heading of the vehicle at one or more different times or one or more different locations; and an acceleration of the vehicle at one or more different times or one or more different locations.

As used herein, the words "geographic location," "location," "geographic position" and "position" refer to a latitude and longitude of an object (or, a latitude, longitude, and elevation of an object) such as a connected vehicle. The example embodiments described herein provide positioning information that describes a geographic position of a vehicle with an accuracy of one or more of: (1) at least plus or minus 1.5 meters in relation to the actual geographic position of the vehicle in 2 dimensions including a latitude and a longitude; and (2) at least plus or minus 3 meters in relation to the actual geographic position of the vehicle in an elevation dimension. Accordingly, the example embodiments described herein are able to describe the geographic position of the vehicle with lane-level accuracy or better.

Example Overview

Figure 1A:
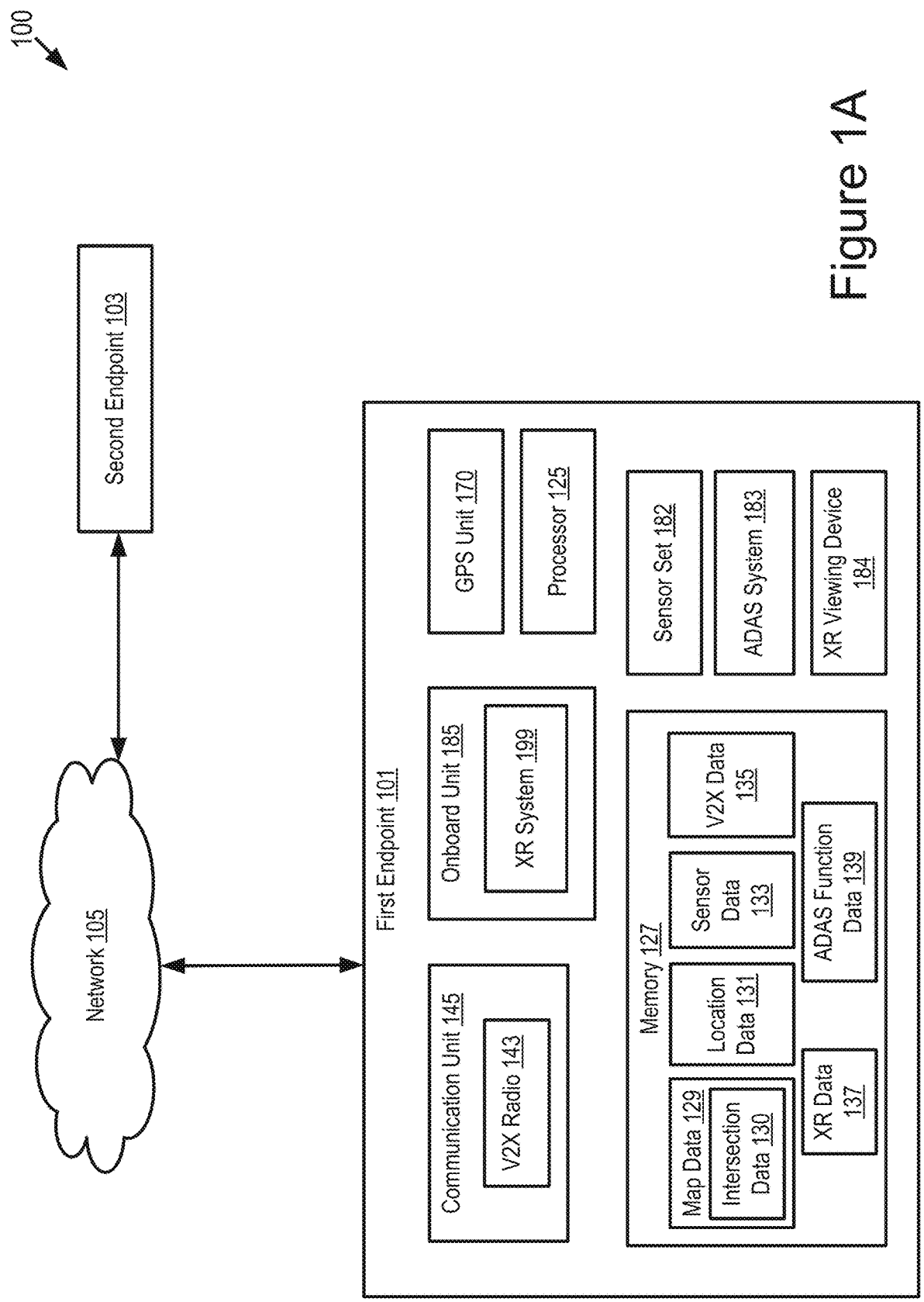
FIG. 1A is a block diagram illustrating an operating environment for an XR system according to some embodiments.

Referring to FIG. 1A, depicted is an operating environment 100 for an XR system 199 according to some embodiments. The operating environment 100 may include one or more of the following elements: a first endpoint 101; and a second endpoint 103. These elements of the operating environment 100 may be communicatively coupled to a network 105. Although not depicted in FIG. 1A, the operation environment 100 may include one or more roadside units (RSUs) that are DSRC-enabled. The one or more DSRC-enabled RSUs may relay wireless messages among the first endpoint 101 and the second endpoint 103 via the network 105. For example, the range of DSRC transmissions is generally about 500 meters, and so, if the second endpoint 103 is 700 meters away from the first endpoint 101, then one or more intervening DSRC-enabled RSUs may relay a DSRC message from the second endpoint 103 to the first endpoint 101 or from the first endpoint 101 to the second endpoint 103.

Although two endpoints and one network 105 are depicted in FIG. 1A, in practice the operating environment 100 may include any number of endpoints and any number of networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, LTE, LTE-V2V, LTE-V2X, LTE-D2D, VoLTE, 5G-V2X or any other mobile data network or combination of mobile data networks. Further, the network 105 may include one or more IEEE 802.11 wireless networks.

In some embodiments, the network 105 is a V2X network, which is a wireless network for sending and receiving V2X wireless messages among various endpoints (e.g., vehicles, roadside equipment, etc.) that each include a V2X radio.

The first endpoint 101 and the second endpoint 103 can be any communication device in a roadway environment. For example, each of the first endpoint 101 and the second endpoint 103 can be a vehicle, a base station, a roadside unit or any other roadside infrastructure device, a motorcycle, a bike, a mobile phone or any other mobile electronic device that is capable of accessing the network 105. For example, the mobile electronic device can be mounted on a motorcycle or a bike, or can be carried by a pedestrian that crosses the intersection.

In some embodiments, the first endpoint 101 and the second endpoint 103 may provide similar functionality, and the description provided below for the first endpoint 101 may also be applicable to the second endpoint 103.

The first endpoint 101 may include one or more of the following elements: a processor 125; a memory 127; a communication unit 145; a GPS unit 170; a sensor set 182; an ADAS system 183; an XR viewing device 184; an onboard unit 185; and the XR system 199. These elements of the first endpoint 101 may be communicatively coupled to one another via a bus.

In some embodiments, the processor 125 and the memory 127 may be elements of an onboard computer system (such as computer system 200 described below with reference to FIG. 2). The onboard computer system may be operable to cause or control the operation of the XR system 199. The onboard computer system may be operable to access and execute the data stored on the memory 127 to provide the functionality described herein for the XR system 199 or its elements (see, e.g., FIG. 2). In some embodiments, the first endpoint 101 is a vehicle, and the onboard computer system is an onboard vehicle computer system.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The first endpoint 101 may include one or more processors 125. Other processors, operating systems, sensors, displays, and physical configurations may be possible.

The memory 127 stores instructions or data that may be executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The first endpoint 101 may include one or more memories 127.

The memory 127 of the first endpoint 101 may store one or more of the following elements: map data 129; location data 131; sensor data 133; V2X data 135; XR data 137; and ADAS function data 139.

The map data 129 includes digital data that describes a digital map of a roadway environment. The digital map includes latitudes and longitudes. In some embodiments, the digital map also includes elevations. The map data 129 includes intersection data 130. The intersection data 130 includes digital data describes locations (e.g., latitude and longitude coordinates) of intersections within the roadway environment.

The location data 131 includes digital data that describes a geographic location of the first endpoint 101 as determined by one or more onboard sensors of this particular endpoint. For example, the location data 131 includes GPS data describing the geographic location of the first endpoint 101.

The sensor data 133 includes digital data describing one or more measurements recorded by one or more sensors of the sensor set 182 onboard on the first endpoint 101. For example, the sensor data 133 includes digital data describing one or more measurements that describe a roadway environment surrounding the first endpoint 101. In another example, the sensor data 133 may also describe information about the first endpoint 101 such as its velocity, heading, acceleration or deceleration, etc.

In some embodiments, the first endpoint 101 receives a V2X wireless message from the second endpoint 103, where the V2X wireless message includes sensor data recorded by one or more sensors of the second endpoint 103. The sensor data 133 stored in the memory 127 of the first endpoint 101 may also include the sensor data recorded by the one or more sensors of the second endpoint 103.

In some embodiments, the XR system determines whether the first endpoint 101 currently approaches an intersection, and thus needs to provide its XR overlay functionality, based on comparing the location data 131 to the intersection data 130 that is included in the map data 129. For example, if a geographic location of the first endpoint 101 described by the location data 131 is getting close and close to a position described by the intersection data 130, then the XR system determines that the first endpoint 101 is approaching an intersection described by the intersection data 130 and thus needs to provide its XR overlay functionality on the first endpoint 101.

Alternatively, the XR system uses the sensor data 133 alone (e.g., camera images, which may or may not be compared to object priors or some other digital reference) to determine whether the first endpoint 101 currently approaches an intersection. If the first endpoint 101 approaches the intersection currently, the XR system triggers the XR overlay functionality for the first endpoint 101. For example, the XR system may perform one or more image processing techniques on images captured by camera sensors of the first endpoint 101 and identify that the first endpoint 101 is approaching an intersection based on an analysis result of the images.

In some embodiments, the XR system may use a combination of the location data 131, the map data 129 (e.g., the intersection data 130) and the sensor data 133 to determine whether the first endpoint 101 approaches an intersection currently.

The V2X data 135 includes digital data transmitted to the first endpoint 101 from the second endpoint 103. The V2X data 135 includes, for example, one or more of the following: the sensor data recorded by the second endpoint 103; location data describing a geographic location of a reserved slot of the second endpoint 103; and endpoint data describing a velocity, a current location, a heading, an acceleration or a deceleration, a travel path of the second endpoint 103, etc.

The XR data 137 includes graphical data that is generated by the XR system 199 based on one or more of the following: the map data 129; the location data 131; the sensor data 133; and the V2X data 135. In some embodiments, the XR data 137 is configured for generating a graphical overlay for presenting a safe zone that the first endpoint 101 stays within while approaching an intersection to improve safety of the first endpoint 101. Alternatively or additionally, the XR data 137 is further configured for generating the graphical overlay that also presents a reserved slot within the safe zone that is reserved for the first endpoint 101. For example, the XR data 137 is configured to generate a graphical overlay such as those depicted in FIGS. 6-9.

The ADAS function data 139 includes digital data that describes one or more settings of the ADAS system 183 of the first endpoint 101 that are calculated by the XR system 199 in order to optimize the safety of the first endpoint 101 so that the first endpoint 101 stays positioned within the safe zone and ideally located at its reserved slot even as the location of the reserved slot may adaptively change over time.

The communication unit 145 transmits and receives data to and from a network 105 or to another communication channel. In some embodiments, the communication unit 145 may include a DSRC transceiver, a DSRC receiver and other hardware or software necessary to make the first endpoint 101 a DSRC-enabled device. For example, the communication unit 145 includes a DSRC antenna configured to broadcast DSRC messages via the network. The DSRC antenna may also transmit BSM messages at a fixed or variable interval (e.g., every 0.1 seconds, at a time interval corresponding to a frequency range from 1.6 Hz to 10 Hz, etc.) that is user configurable.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471, 387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System."

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

The communication unit 145 includes a V2X radio 143. The V2X radio 143 is an electronic device that includes a V2X transmitter and a V2X receiver and is operable to send and receive wireless messages via any V2X protocol. For example, the V2X radio 143 is operable to send and receive wireless messages via DSRC. The V2X transmitter is operable to transmit and broadcast DSRC messages over the 5.9 GHz band. The V2X receiver is operable to receive DSRC messages over the 5.9 GHz band.

In some embodiments, the GPS unit 170 is a conventional GPS unit of the first endpoint 101. For example, the GPS unit 170 may include hardware that wirelessly communicates with a GPS satellite to retrieve data that describes a geographic location of the first endpoint 101. For example, the GPS unit 170 retrieves GPS data describing the geographic location of the first endpoint 101 from one or more GPS satellites. In some embodiments, the GPS unit 170 is a DSRC-compliant GPS unit of the first endpoint 101 that is operable to provide GPS data describing the geographic location of the first endpoint 101 with lane-level accuracy.

The sensor set 182 includes one or more sensors that are operable to measure a roadway environment outside of the first endpoint 101. For example, the sensor set 182 may include one or more sensors that record one or more physical characteristics of the roadway environment that is proximate to the first endpoint 101. The memory 127 may store sensor data that describes the one or more physical characteristics recorded by the sensor set 182. The roadway environment outside of the first endpoint 101 may include the second endpoint 103, and so, one or more of the sensors of the sensor set 182 may record sensor data that describes information about the second endpoint 103.

In some embodiments, the sensor set 182 may include one or more of the following vehicle sensors: a camera; a LIDAR sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

In some embodiments, the sensor set 182 includes any sensors that are operable to record digital data describing the environment of the first endpoint 101, and optionally locations of stop signs, traffic signals or a combination thereof within an intersection and locations of other endpoints (e.g., the second endpoint 103) as well as their velocities, heading, and acceleration or deceleration over time. For example, the sensor set 182 may include range finding and position locating sensors such as LIDAR, radar, and GPS, as well as any other sensors. The sensor data recorded by the sensor set 182 describes one or more roadway measurements by the sensor set 182. The sensor data may also describe information about the first endpoint 101 and the second endpoint 103 such as their velocities, heading, acceleration or deceleration, etc.

The onboard unit 185 may be a computing device onboard on the first endpoint 101. For example, the onboard unit 185 includes an ECU. The ECU is an embedded system in automotive electronics that controls one or more of electrical systems or subsystems in the first endpoint 101. Types of the ECU include, but are not limited to, the following: Engine Control Module (ECM); Powertrain Control Module (PCM); Transmission Control Module (TCM); Brake Control Module (BCM or EBCM); Central Control Module (CCM); Central Timing Module (CTM); General Electronic Module (GEM); Body Control Module (BCM); and Suspension Control Module (SCM), etc.

In some embodiments, the first endpoint 101 may include multiple onboard units 185 (e.g., multiple ECUs). In some embodiments, the XR system 199 may be an element of the onboard unit 185.

In some embodiments, the ADAS system 183 is a conventional ADAS system that controls operation of the first endpoint 101. Alternatively or additionally, the first endpoint 101 may include an autonomous driving system (not depicted in FIG. 1A). In some embodiments, the ADAS system 183 may also include any software or hardware included in the first endpoint 101 that makes the first endpoint 101 an autonomous vehicle or a semi-autonomous vehicle.

In some embodiments, the first endpoint 101 is a vehicle. The ADAS system 183 is operable to modify an operation of the first endpoint 101 and may override a driving command (or an input) of a driver of the first endpoint 101 if the driving command is unsafe (e.g., due to a misunderstanding about where the first endpoint 101 should be located while approaching an intersection).

Examples of the ADAS system 183 may include one or more of the following elements of the first endpoint 101: an adaptive cruise control ("ACC") system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; and a wrong-way driving warning system.

In some embodiments, the XR viewing device 184 includes hardware installed in the first endpoint 101 and modified by the XR system 199 to assist a user of the first endpoint 101 (e.g., a driver of a vehicle) as follows: (1) if the first endpoint 101 is non-autonomous, then the XR system helps the user that manages the travel through an intersection himself/herself by informing the user of a location of a safe zone and a reserved slot while approaching the intersection (see, e.g., FIG. 6-9); or (2) if the first endpoint 101 is autonomous, helping the user to know or anticipate what actions the first endpoint 101 may take in the future. The XR viewing device 184 may include either an AR headset or a three-dimensional heads-up display unit ("3D HUD") installed in the first endpoint 101.

If an AR headset is used as the XR viewing device 184, then it is worn by the user when operating the first endpoint 101. The AR headset may include any conventional AR goggles or glasses which are modified to include the color-blind AR assistance system. Examples of suitable AR headsets include, but are not limited to, the following: Google Glass; CastAR; Moverio BT-200; Meta; Vuzix M-100; Laster SeeThru; Icis; Optinvent ORA-S; GlassUP; Atheer One; and K-Glass. Each of these AR headsets are configured so that the user can still be focused on the travel experience through the intersection and not distracted by the graphical overlays presented by the AR headsets.

Figure 10:
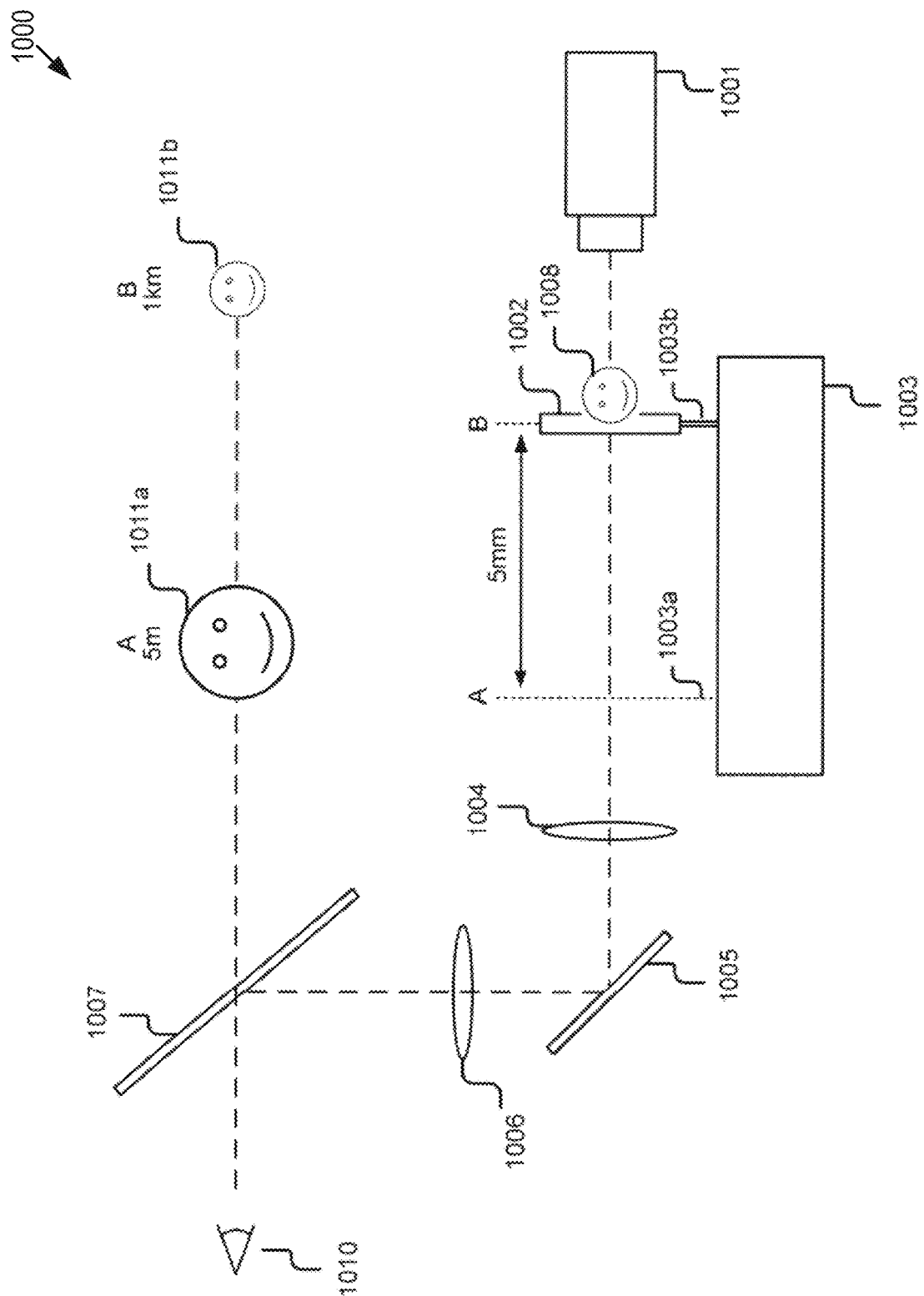
FIG. 10 is a block diagram illustrating an example structure of an XR viewing device according to some embodiments.

If a 3D HUD is used as the XR viewing device 184 (here, assume that the first endpoint 101 is a vehicle), then it is installed in the vehicle so that the driver looks through the 3D HUD whenever he/she is looking through a front windshield of the vehicle. An example of a 3D HUD is depicted in FIG. 10.

In any use case of the XR viewing device 184, the XR viewing device 184 is configured so that the user can see the real-world at all times and is not disconnected from the travel experience. For example, if the user is a driver, the driver can see the real-world at all times and is not disconnected from the driving experience. The XR viewing device 184 displays graphical objects that selectively overlay the real world based on the XR data provided by the XR system 199. In some embodiments, the graphical overlays may only be present in the XR viewing device 184 when the user is looking at the XR viewing device 184.

In some embodiments, the XR system 199 includes software that is operable, when executed by the processor 125, to cause the processor 125 to execute one or more steps of an example process 191 and methods 300 and 400 described below with reference to FIGS. 1C and 3-4B.

In some embodiments, the XR system 199 may be implemented using hardware including a field-programmable gate array ("FPGA") or an application-specific integrated circuit ("ASIC"). In some other embodiments, the XR system 199 may be implemented using a combination of hardware and software. The XR system 199 may be stored in a combination of the devices (e.g., servers or other devices), or in one of the devices.

For example, the XR system 199 is operable to execute one or more of the following operations: (1) causing the sensors of the first endpoint 101 to record first sensor data and GPS data of the first endpoint 101 (here, the sensor data recorded by the first endpoint 101 is referred to as "first sensor data"); (2) determining whether the first endpoint 101 approaches an intersection currently based on one or more of the following: the first sensor data; the GPS data; the map data; and the intersection data; (3) receiving V2X data from the second endpoint 103; (4) determining second sensor data of the second endpoint 103 and a second reserved slot of the second endpoint 103 based on the V2X data (here, the sensor data recorded by the second endpoint 103 is referred to as "second sensor data," a reserved slot for the first endpoint 101 is referred to as "first reserved slot," and a reserved slot for the second endpoint 103 is referred to as "second reserved slot"); (5) generating XR data based on the first sensor data of the first endpoint 101, the second sensor data of the second endpoint 103 as well as information describing the second reserved slot of the second endpoint 103 if this is received by the first endpoint 101, where the XR data is configured to generate an XR overlay for presenting a safe zone that the first endpoint 101 stays within and the first reserved slot within the safe zone for the first endpoint 101 while approaching the intersection to improve safety of the first endpoint 101; (6) generating ADAS function data based on the first sensor data of the first endpoint 101, the second sensor data of the second endpoint 103 as well as information describing the second reserved slot of the second endpoint 103 if this is received by the first endpoint 101; (7) providing the XR data to the XR viewing device 184 and causing it to generate the XR overlay; and (8) providing the ADAS function data to the ADAS system 183 and causing the ADAS system 183 to provide functionality consistent with the ADAS function data.

The XR system 199 is described in more detail below with reference to FIGS. 1C-9.

Figure 1B:
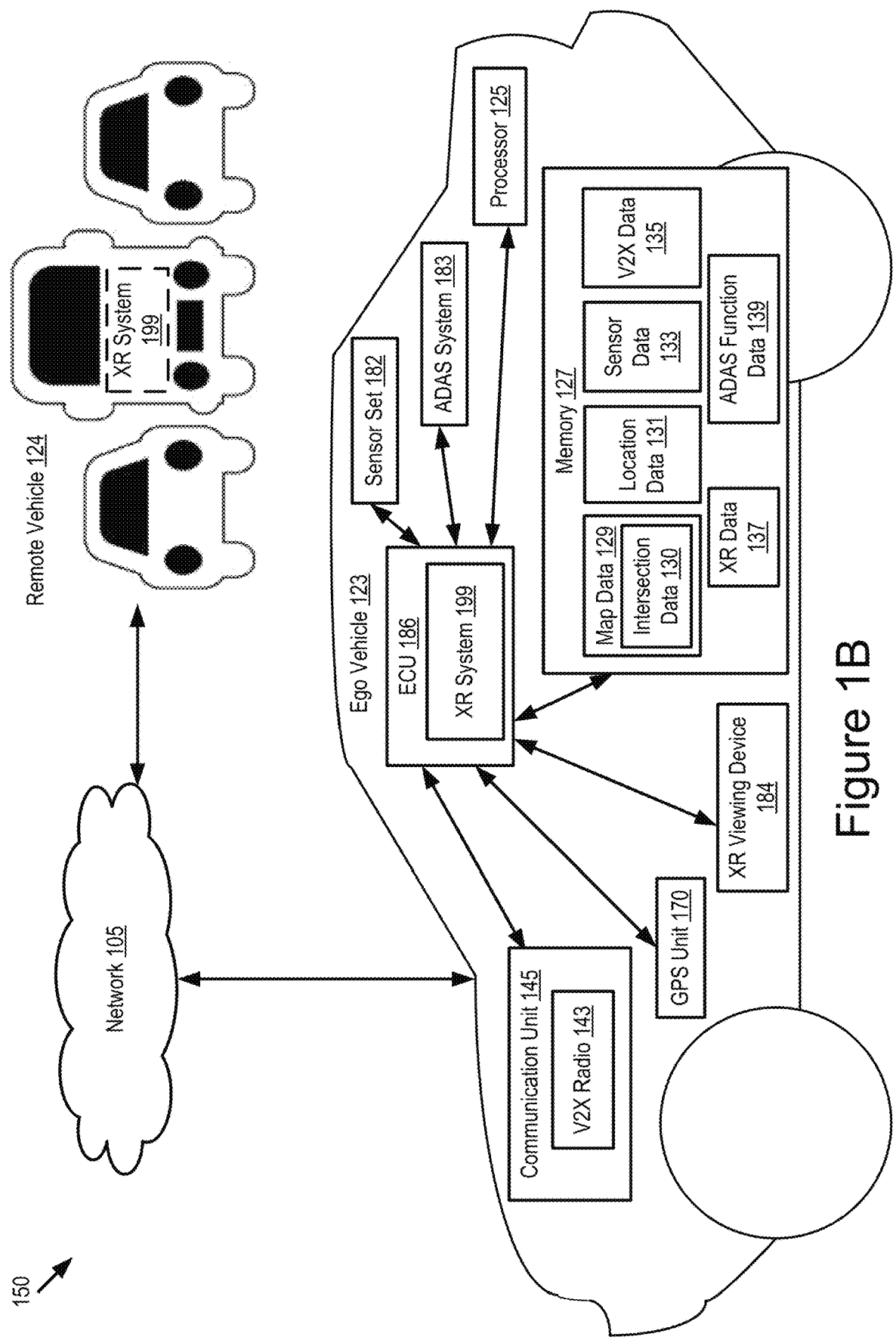
FIG. 1B is another block diagram illustrating an operating environment for an XR system according to some embodiments.

Referring to FIG. 1B, depicted is another operating environment 150 for the XR system 199 according to some embodiments. The operating environment 150 may include one or more of the following elements: an ego vehicle 123; and one or more remote vehicles 124. These elements of the operating environment 150 may be communicatively coupled to the network 105.

Although one ego vehicle 123, three remote vehicles 124 and one network 105 are depicted in FIG. 1B, in practice the operating environment 150 may include one or more ego vehicles 123, one or more remote vehicles 124 and one or more networks 105.

In some embodiments, the ego vehicle 123 may be an example of the first endpoint 101 and a remote vehicle 124 may be an example of the second endpoint 103. Thus, description provided herein for the first endpoint 101 and the second endpoint 103 may also be applicable to the ego vehicle 123 and the remote vehicle 124. Similar description is not repeated here.

In some embodiments, the ego vehicle 123 and the remote vehicle 124 may have a similar structure, and the description provided below for the ego vehicle 123 may also be applicable to the remote vehicle 124.

In some embodiments, at least one remote vehicle 124 is a connected vehicle like the ego vehicle 123. In some embodiments, at least one remote vehicle 124 is an unconnected vehicle. The remote vehicle 124 includes elements that are similar to those of the ego vehicle 123 including, for example, the sensors and the V2X radio. In some embodiments, the remote vehicle 124 includes its own instance of the XR system 199 (depicted using a dash-line box in FIG. 1B).

In some embodiments, one or more of the ego vehicle 123 and the remote vehicle 124 may be DSRC-equipped devices. The network 105 may include one or more communication channels shared among the ego vehicle 123, the remote vehicle 124 and one or more RSUs. The one or more communication channels may include DSRC, LTE-V2X, full-duplex wireless communication or any other wireless communication protocol. For example, the network 105 may be used to transmit a DSRC message, DSRC probe or BSM including any of the data described herein.

The ego vehicle 123 may be any type of vehicle. For example, the ego vehicle 123 may include one of the following types of vehicles: a car; a truck; a sports utility vehicle; a bus; a semi-truck; a drone or any other roadway-based conveyance. For example, the ego vehicle 123 is a connected vehicle including the XR system 199, the V2X radio 143 and the XR viewing device 184.

In some embodiments, the ego vehicle 123 may include an autonomous vehicle or a semi-autonomous vehicle. For example, the ego vehicle 123 may include an Advanced Driver-Assistance System (e.g., the ADAS system 183) or an autonomous driving system. The ADAS system 183 or the autonomous driving system may provide some or all of the functionality that provides autonomous functionality.

The ego vehicle 123 may include one or more of the following elements: the processor 125; the memory 127; the communication unit 145; the GPS unit 170; the sensor set 182; an ECU 186; the ADAS system 183; the XR viewing device 184; and the XR system 199. These elements of the ego vehicle 123 may be communicatively coupled to one another via a bus. These elements of the ego vehicle 123 are described above with reference to FIG. 1A, and similar description is not repeated here.

Figure 1C:
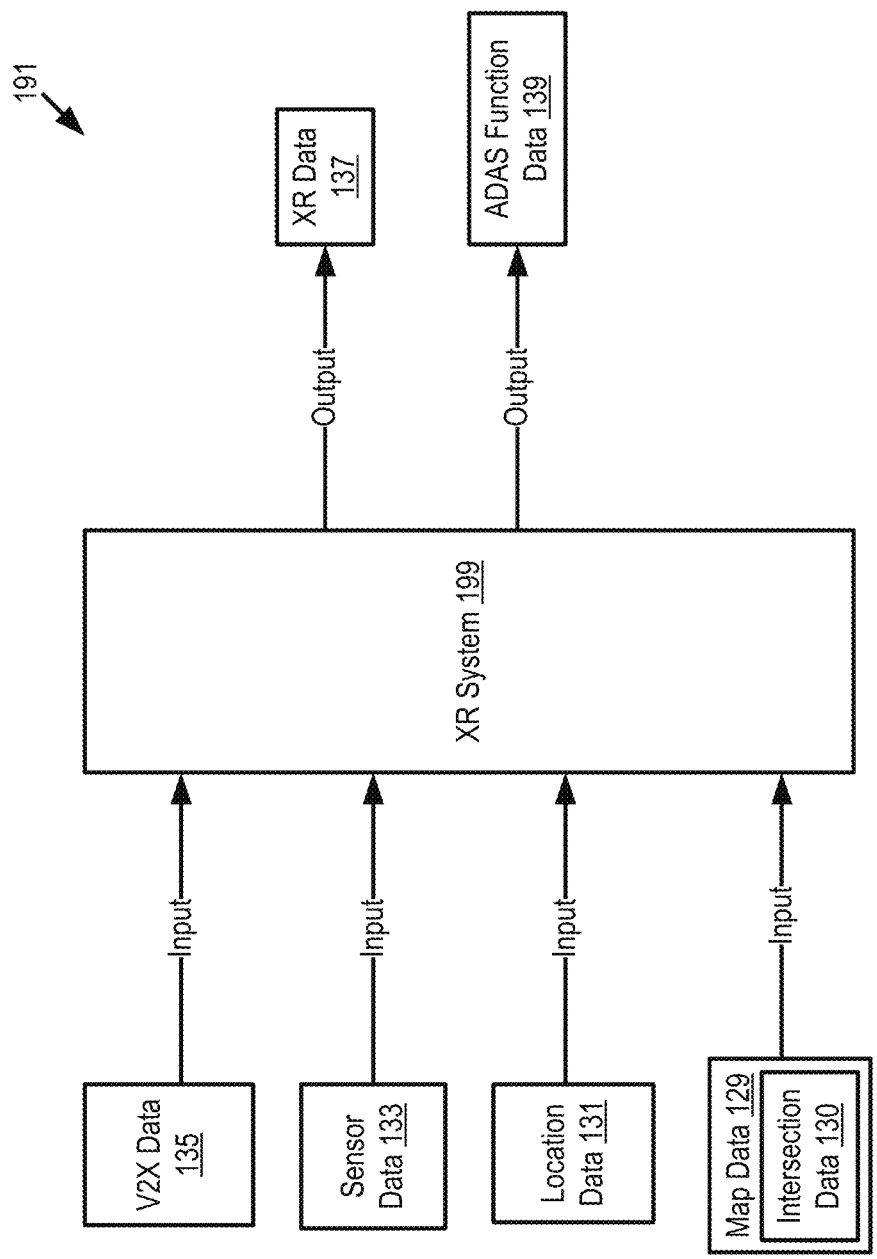
FIG. 1C depicts an example process executed by an XR system to generate XR data and ADAS function data according to some embodiments.

Referring to FIG. 1C, an example process 191 executed by the XR system 199 is depicted according to some embodiments. In the example process 191, the XR system 199 uses the V2X data 135, the sensor data 133, the location data 131 and the map data 129 (including the intersection data 130) as inputs, and generates the XR data 137 as an output. Additionally, the XR system 199 may also generate the ADAS function data 139 as an output.

In some embodiments, the XR system 199 described herein may be implemented in vehicles (e.g., the ego vehicle 123, the remote vehicle 124), motorcycles, bikes, mobile electronic devices mounted on motorcycles or bikes, or mobile electronic devices carried by pedestrians, etc. For example, the XR system 199 can be applied to manage traffic at intersections involving vehicles, motorcycles, bikes and pedestrians, etc. Other example use cases of the XR system 199 are possible, which is not limited herein.

Example Computer System

Figure 2:
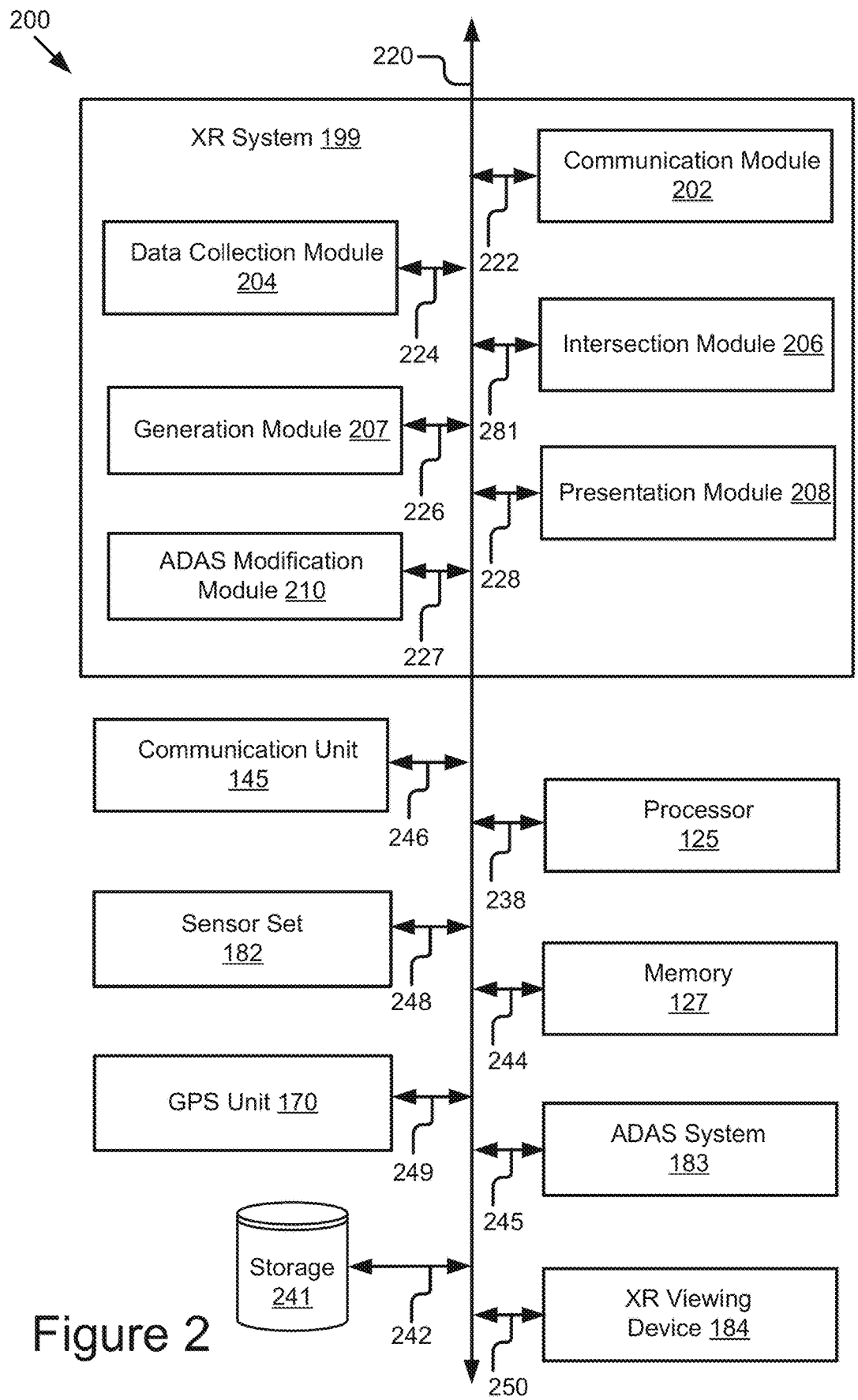
FIG. 2 is a block diagram illustrating an example computer system including an XR system according to some embodiments.

Referring now to FIG. 2, depicted is a block diagram illustrating an example computer system 200 including the XR system 199 according to some embodiments. In some embodiments, the computer system 200 may include a special-purpose computer system that is programmed to perform one or more steps of methods 300 and 400 described below with reference to FIGS. 3-4B.

In some embodiments, the computer system 200 may be an element of the first endpoint 101. In some embodiments, the computer system 200 may be an onboard computer of the first endpoint 101. For example, if the first endpoint 101 is a vehicle, the computer system 200 may be an onboard vehicle computer of the first endpoint 101. In some embodiments, the computer system 200 may include an engine control unit, head unit or some other processor-based computing device of the first endpoint 101.

The computer system 200 may include one or more of the following elements according to some examples: the XR system 199; the processor 125; the communication unit 145; the sensor set 182; the GPS unit 170; the memory 127; the ADAS system 183; the XR viewing device 184; and a storage 241. The components of the computer system 200 are communicatively coupled by a bus 220.

In the illustrated embodiment, the processor 125 is communicatively coupled to the bus 220 via a signal line 238. The communication unit 145 is communicatively coupled to the bus 220 via a signal line 246. The sensor set 182 is communicatively coupled to the bus 220 via a signal line 248. The GPS unit 170 is communicatively coupled to the bus 220 via a signal line 249. The storage 241 is communicatively coupled to the bus 220 via a signal line 242. The memory 127 is communicatively coupled to the bus 220 via a signal line 244. The ADAS system 183 is communicatively coupled to the bus 220 via a signal line 245. The XR viewing device 184 is communicatively coupled to the bus 220 via a signal line 250.

The following elements of the computer system 200 are described above with reference to FIGS. 1A-1B, and so, those descriptions will not be repeated here: the processor 125; the communication unit 145; the sensor set 182; the GPS unit 170; the ADAS system 183; the XR viewing device 184; and the memory 127.

The storage 241 can be a non-transitory storage medium that stores data for providing the functionality described herein. The storage 241 may be a dynamic random-access memory (DRAM) device, a static random-access memory (SRAM) device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment shown in FIG. 2, the XR system 199 includes: a communication module 202; a data collection module 204; an intersection module 206; a generation module 207; a presentation module 208; and an ADAS modification module 210. These components of the XR system 199 are communicatively coupled to each other via the bus 220. In some embodiments, components of the XR system 199 can be stored in a single server or device. In some other embodiments, components of the XR system 199 can be distributed and stored across multiple servers or devices. For example, some of the components of the XR system 199 may be distributed across the second endpoint 103 and the first endpoint 101.

The communication module 202 can be software including routines for handling communications between the XR system 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via a signal line 222.

The communication module 202 sends and receives data, via the communication unit 145, to and from one or more elements of the operating environment 100 or 150. For example, the communication module 202 receives or transmits, via the communication unit 145, a V2X wireless message. The communication module 202 may send or receive any of the data or messages described above with reference to FIGS. 1A-1C via the communication unit 145.

In some embodiments, the communication module 202 receives data from components of the XR system 199 and stores the data in one or more of the storage 241 and the memory 127. For example, the communication module 202 receives any of the data described above with reference to the memory 127 from the communication unit 145 (via the network 105, a DSRC message, a BSM, a DSRC probe, a full-duplex wireless message, etc.) and stores this data in the memory 127 (or temporarily in the storage 241 which may act as a buffer for the computer system 200).

In some embodiments, the communication module 202 may handle communications between components of the XR system 199. For example, the communication module 202 may handle communications among the data collection module 204, the intersection module 206, the generation module 207, the presentation module 208 and the ADAS modification module 210. Any of these modules may cause the communication module 202 to communicate with the other elements of the computer system 200 or the operating environment 100 or 150 (via the communication unit 145). For example, the data collection module 204 may use the communication module 202 to communicate with the sensor set 182 and cause the sensor set 182 to record sensor data.

The data collection module 204 can be software including routines for collecting various data for the first endpoint 101. In some embodiments, the data collection module 204 can be stored in the memory 127 of the computer system 200 and can be accessible and executable by the processor 125. The data collection module 204 may be adapted for cooperation and communication with the processor 125 and other components of the computer system 200 via a signal line 224.

In some embodiments, the data collection module 204 may operate one or more sensors of the sensor set 182 to generate first sensor data describing the measurements of the sensor set 182 onboard on the first endpoint 101. The data collection module 204 may cause the first sensor data to be stored in the memory 127. Specifically, the data collection module 204 may operate one or more sensors included in the sensor set 182 to record first sensor data describing measurements of a physical environment proximate to the computer system 200. The second endpoint 103 may or may not be located in the physical environment proximate to the first endpoint 101 that includes the computer system 200.

In some embodiments, the data collection module 204 may cause the GPS unit 170 to retrieve positional information for the computer system 200. For example, the computer system 200 is an element of the first endpoint 101 and the data collection module 204 may cause the GPS unit 170 to retrieve location data (e.g., GPS data) describing the geographic location of the first endpoint 101.

In some embodiments, the data collection module 204 is operable to access a map server or communicate with other endpoints on a roadway environment via the communication unit 145 to retrieve map data describing a map of a roadway environment associated with the geographic location of the first endpoint 101. For example, assume that the first endpoint 101 approaches an intersection currently. The data collection module 204 is operable to retrieve map data describing a roadway map for the intersection from a map server or from another endpoint that has stored a copy of the roadway map via the V2X radio 143.

In some embodiments, the data collection module 204 receives a V2X wireless message from the second endpoint 103 via the V2X radio 143, where the V2X wireless message includes V2X data generated by the second endpoint 103. The V2X data of the second endpoint 103 includes one or more of second sensor data recorded by one or more sensors of the second endpoint 103 and second slot data describing a second reserved slot for the second endpoint 103.

The data collection module 204 may aggregate one or more of the following data and send one or more of the following data to the intersection module 206, the generation module 207 and the ADAS modification module 210: the first sensor data of the first endpoint 101; the location data of the first endpoint 101; and the V2X data of the second endpoint 103 (including one or more of the second sensor data and the second slot data).

The intersection module 206 can be software including routines that, when executed by the processor 125, cause the processor 125 to determine whether the first endpoint 101 approaches an intersection currently. In some embodiments, the intersection module 206 can be a set of instructions stored in the memory 127 of the computer system 200 and can be accessible and executable by the processor 125. The intersection module 206 may be adapted for cooperation and communication with the processor 125 and other components of the computer system 200 via a signal line 281.

In some embodiments, the intersection module 206 is operable to receive one or more of the first sensor data, the location data and the map data from the data collection module 204. The intersection module 206 determines that the first endpoint 101 approaches the intersection currently based on one or more of the first sensor data, the location data and the map data.

For example, the intersection module 206 determines whether the first endpoint 101 approaches an intersection currently based on a comparison between the location data and the intersection data included in the map data that describes the intersection (e.g., if a geographic location of the first endpoint 101 described by the location data is getting close and close to a position described by the intersection data, then the intersection module 206 determines that the first endpoint 101 is approaching the intersection described by the intersection data 130).

In another example, the intersection module 206 uses the first sensor data alone (e.g., camera images, which may or may not be compared to object priors or some other digital reference) to determine whether the first endpoint 101 approaches an intersection currently (e.g., the intersection module 206 may perform one or more image processing techniques on images captured by camera sensors of the first endpoint 101, and may identify that the first endpoint 101 is approaching an intersection based on an analysis result of the images because the analysis result of the images indicates that a distance between the first endpoint 101 and the intersection becomes smaller and smaller).

In yet another example, the intersection module 206 may use a combination of the location data, the map data (e.g., the intersection data) and the first sensor data to determine whether the first endpoint 101 approaches an intersection currently.

In some embodiments, the intersection module 206 of the first endpoint 101 is also operable to determine that the second endpoint 103 approaches the intersection currently based on one or more of the V2X data of the second endpoint 103 and the first sensor data of the first endpoint 101. For example, the first sensor data may include image data depicting the second endpoint 103 that is approximate to the first endpoint 101 and travels in a same direction as the first endpoint 101. Responsive to determining that the first endpoint 101 approaches the intersection, the intersection module 206 also determines that the second endpoint 103 approaches the intersection currently. In another example, the V2X data of the second endpoint 103 already includes the second slot data describing the second reserved slot at the intersection for the second endpoint 103 (which indicates that the second endpoint 103 already detects that the second endpoint 103 approaches the intersection currently), and so, the intersection module 206 of the first endpoint 101 can determine that the second endpoint 103 also approaches the intersection currently. In yet another example, the intersection module 206 analyzes the second sensor data of the second endpoint 103 to determine that the second endpoint 103 also approaches the intersection.

The generation module 207 can be software including routines that, when executed by the processor 125, cause the processor 125 to generate XR data. In some embodiments, the generation module 207 can be stored in the memory 127 of the computer system 200 and can be accessible and executable by the processor 125. The generation module 207 may be adapted for cooperation and communication with the processor 125 and other components of the computer system 200 via a signal line 226.

In some embodiments, the generation module 207 receives one or more of the first sensor data, the location data, the map data and the V2X data of the second endpoint 103 from the data collection module 204. The V2X data of the second endpoint 103 may include one or more of: the second sensor data; the second slot data of the second endpoint 103; and endpoint data describing a velocity, a current location, a heading, an acceleration or a deceleration, and a travel path of the second endpoint 103. The generation module 207 generates the XR data based on one or more of the first sensor data of the first endpoint 101, the location data of the first endpoint 101, the map data, the second sensor data of the second endpoint 103, the second slot data of the second endpoint 103 and the endpoint data of the second endpoint 103.

The XR data is configured to generate a graphical overlay for presenting a safe zone that the first endpoint 101 stays within while approaching the intersection to improve safety of the first endpoint 101. Alternatively or additionally, the XR data is further configured to generate the graphical overlay for presenting first slot data describing a first reserved slot within the safe zone that is reserved for the first endpoint 101.

The safe zone may include one or more available slots on a road of the intersection that the first endpoint 101 may stay within while approaching the intersection. The safe zone may or may not include a first reserved slot for the first endpoint 101. If the safe zone includes the first reserved slot for the first endpoint 101, the first endpoint 101 can stay within the first reserved slot or any other available slot in the safe zone while traveling through the intersection (e.g., ideally, the first endpoint 101 stays within the first reserved slot in the safe zone while traveling through the intersection). If the safe zone does not include the first reserved slot for the first endpoint 101, the first endpoint 101 can stay within any available slot in the safe zone while traveling through the intersection. The safe zone of the first endpoint 101 does not include any unavailable slot (e.g., unavailable slots are excluded from the safe zone of the first endpoint 101). An unavailable slot can be, for example, a slot that is already reserved for another endpoint or any slot that is not suitable for the first endpoint 101 to stay within.

In some embodiments, one or more of the safe zone and the first reserved slot for the first endpoint 101 change over time while the first endpoint 101 travels through the intersection. For example, as the safe zone for the first endpoint 101 changes over time, the first reserved slot for the first endpoint 101 also changes over time. In another example, the safe zone for the first endpoint 101 is not time-varying, and only the first reserved slot for the first endpoint 101 changes over time as the first endpoint 101 travels through the intersection.

Specifically, the generation module 207 determines one or more of (1) the safe zone and (2) the first reserved slot within the safe zone for the first endpoint 101 to avoid a collision with the second endpoint 103 or any other endpoint based on one or more of the first sensor data of the first endpoint 101, the location data of the first endpoint 101, the map data and the V2X data of the second endpoint 103 (e.g., the second sensor data of the second endpoint 103 and the second slot data of the second endpoint 103, etc.). The generation module 207 generates the XR data that is operable to generate a graphical overlay for presenting the one or more of (1) the safe zone and (2) the first reserved slot.

In some embodiments, XR data is configured to generate the graphical overlay because it includes digital data that is operable to cause the XR viewing device to display the graphical overlay that depicts, for example, one or more of (1) the safe zone and (2) the first reserved slot. This is beneficial in some embodiments, for example, because if the first endpoint is operated (or operates itself) so that the first endpoint stays within this safe zone and/or the first reserved slot then the safety of the first endpoint, as well as the safety of other endpoints, is improved because a collision involving the first endpoint is reduced.

For example, based on the first sensor data of the first endpoint 101 (e.g., based on image data depicting the roadway environment), the generation module 207 determines that a road ahead of the first endpoint 101 towards the intersection is empty and does not have any other vehicles. Then, the generation module 207 determines the safe zone for the first endpoint 101 as a region of the road ahead of the first endpoint 101 that is approximate to the intersection. The generation module 207 may also determine any available slot in that region of the road as the first reserved slot for the first endpoint 101.

In another example, the intersection module 206 analyzes the second sensor data to determine that the second endpoint 103 also approaches the intersection in a same direction as the first endpoint 101. Then, the generation module 207 determines the safe zone for the first endpoint 101 based on the first sensor data of the first endpoint 101, the location data of the first endpoint 101, the map data, the second sensor data and the second slot data of the second endpoint 103, so that the safe zone for the first endpoint 101 is selected as a region of the road ahead of the first endpoint 101, where the selected region of the road is approximate to the intersection and is not occupied by any other endpoint. For example, the second reserved slot for the second endpoint 103 is excluded from the region of the road that is selected as the safe zone. The generation module 207 may determine the first reserved slot for the first endpoint 101 as: (1) an available slot in the safe zone that is closest to the intersection; (2) an available slot in the safe zone that is closest to the current location of the first endpoint 101; (3) an available slot in the safe zone that can reduce a travel time of the first endpoint 101 through the intersection; or (4) any other available slot in the safe zone.

In yet another example, the generation module 207 analyzes V2X wireless messages received from various other vehicles. Based on an analysis of the V2X wireless messages, the generation module 207 determines which of these vehicles are approaching the intersection and their locations (both current locations and future locations) as they approach the intersection. The V2X wireless messages may also include slot data describing reserved slots for the vehicles that approach the intersection. Then, the generation module 207 determines the safe zone for the first endpoint 101 based on the first sensor data of the first endpoint 101, the location data of the first endpoint 101, the map data and the V2X wireless messages, so that the safe zone for the first endpoint 101 includes a region of the road that is approximate to the intersection and is not occupied by the vehicles that also approach the intersection. For example, the reserved slots for the vehicles that also approach the intersection are excluded from the region of the road that is selected as the safe zone for the first endpoint 101.

The presentation module 208 can be software including routines that, when executed by the processor 125, cause the processor 125 to present the XR data on the XR viewing device 184. In some embodiments, the presentation module 208 can be stored in the memory 127 of the computer system 200 and can be accessible and executable by the processor 125. The presentation module 208 may be adapted for cooperation and communication with the processor 125 and other components of the computer system 200 via a signal line 228.

In some embodiments, the presentation module 208 is operable to provide the XR data to the XR viewing device 184 to modify an operation of the XR viewing device 184 so that the XR viewing device 184 presents the safe zone on an XR graphical overlay. In some embodiments, the XR graphical overlay can be an AR overlay, a VR overlay, a MR overlay, or a combination thereof.

In some embodiments, the safe zone and the first reserved slot are color-coded or highlighted using any other approaches within the graphical overlay to facilitate a recognition of the safe zone and the first reserved slot by a user of the first endpoint 101.

The ADAS modification module 210 can be software including routines that, when executed by the processor 125, cause the processor 125 to modify an operation of the ADAS system 183. In some embodiments, the ADAS modification module 210 can be stored in the memory 127 of the computer system 200 and can be accessible and executable by the processor 125. The ADAS modification module 210 may be adapted for cooperation and communication with the processor 125 and other components of the computer system 200 via a signal line 227.

In some embodiments, the first endpoint 101 includes the ADAS system 183. The ADAS modification module 210 generates ADAS function data based on one or more of the first sensor data of the first endpoint 101, the first slot data of the first endpoint 101 and the V2X data of the second endpoint 103 (including the second sensor data of the second endpoint 103, the second slot data of the second endpoint 103, etc.). The ADAS function data includes digital data describing one or more settings for the ADAS system 183 while the first endpoint 101 travels through the intersection. For example, the ADAS function data may be used to control how the first endpoint 101 behaves through the intersection by modifying an operation of the ADAS system 183 during the travel of the first endpoint 101 through the intersection.

The ADAS modification module 210 provides the ADAS function data to the ADAS system 183 to modify an operation of the ADAS system 183 so that the ADAS system 183 controls the first endpoint 101 to stay within the safe zone or the first reserved slot within the safe zone while approaching the intersection for a period of time that is operable to optimize the safety of the first endpoint 101.

In some embodiments, the first endpoint 101 is a vehicle. The ADAS function data may be configured to modify an operation of the ADAS system 183 so that a driving command (or an input) of a driver of the first endpoint 101 is overridden if the driving command is unsafe (e.g., due to a misunderstanding about where the first endpoint 101 should be located while approaching the intersection).

Example Processes

Figure 3:
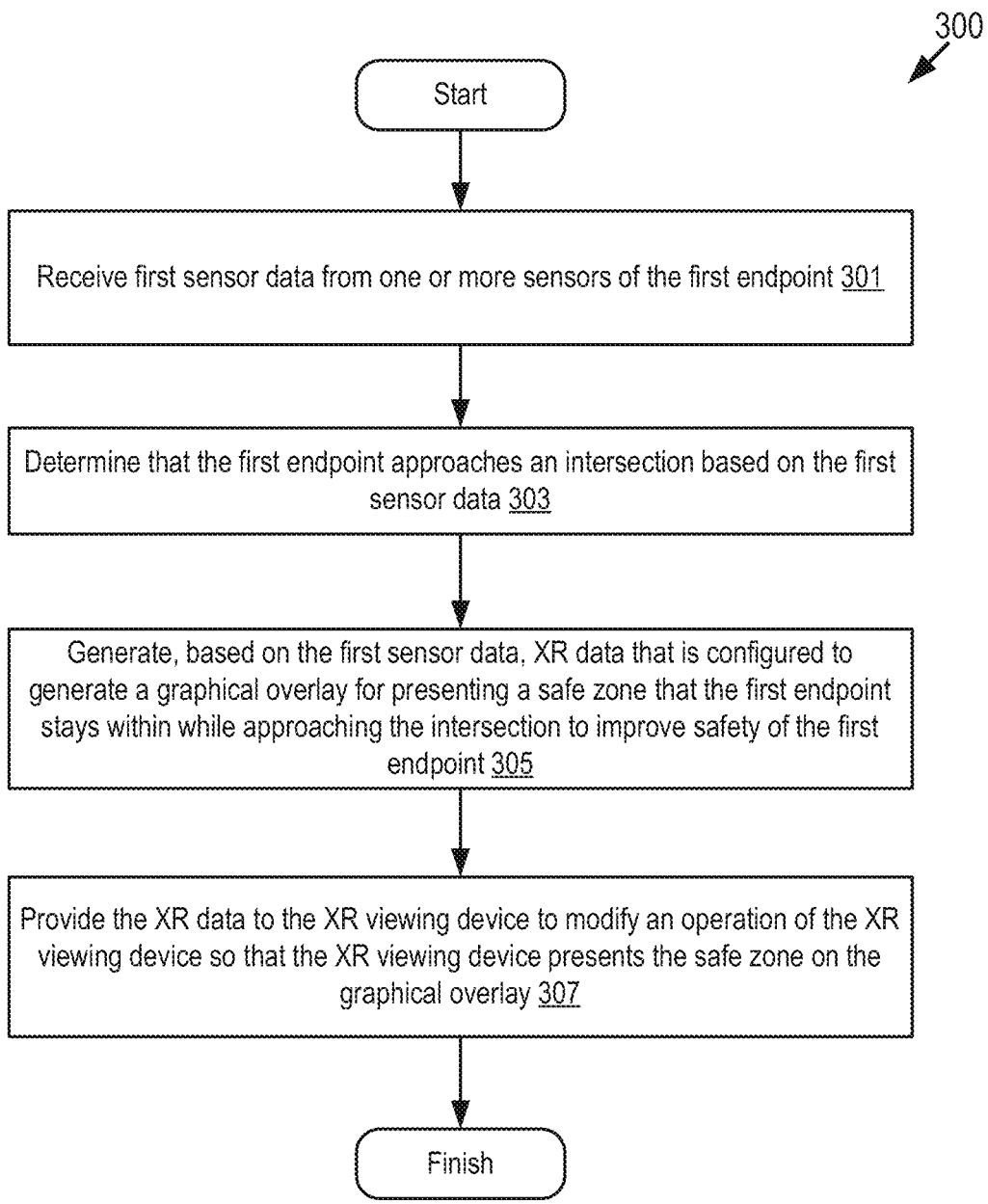
FIG. 3 depicts a method for using XR technologies to improve safety of a first endpoint that travels through an intersection according to some embodiments.

Referring now to FIG. 3, depicted is a flowchart of an example method 300 for using XR technologies to improve safety of the first endpoint 101 that travels through an intersection according to some embodiments. The steps of the method 300 are executable in any order, and not necessarily the order depicted in FIG. 3. The method 300 may be executed by the first endpoint 101.

At step 301, the data collection module 204 receives first sensor data from one or more sensors of the first endpoint 101.

At step 303, the intersection module 206 determines that the first endpoint 101 approaches an intersection based on the first sensor data.

At step 305, the generation module 207 generates, based on the first sensor data, XR data that is operable to generate a graphical overlay for presenting a safe zone that the first endpoint 101 stays within while approaching the intersection to improve safety of the first endpoint 101.

At step 307, the presentation module 208 provides the XR data to the XR viewing device 184 to modify an operation of the XR viewing device 184 so that the XR viewing device 184 presents the safe zone on the graphical overlay.

Figure 4A:
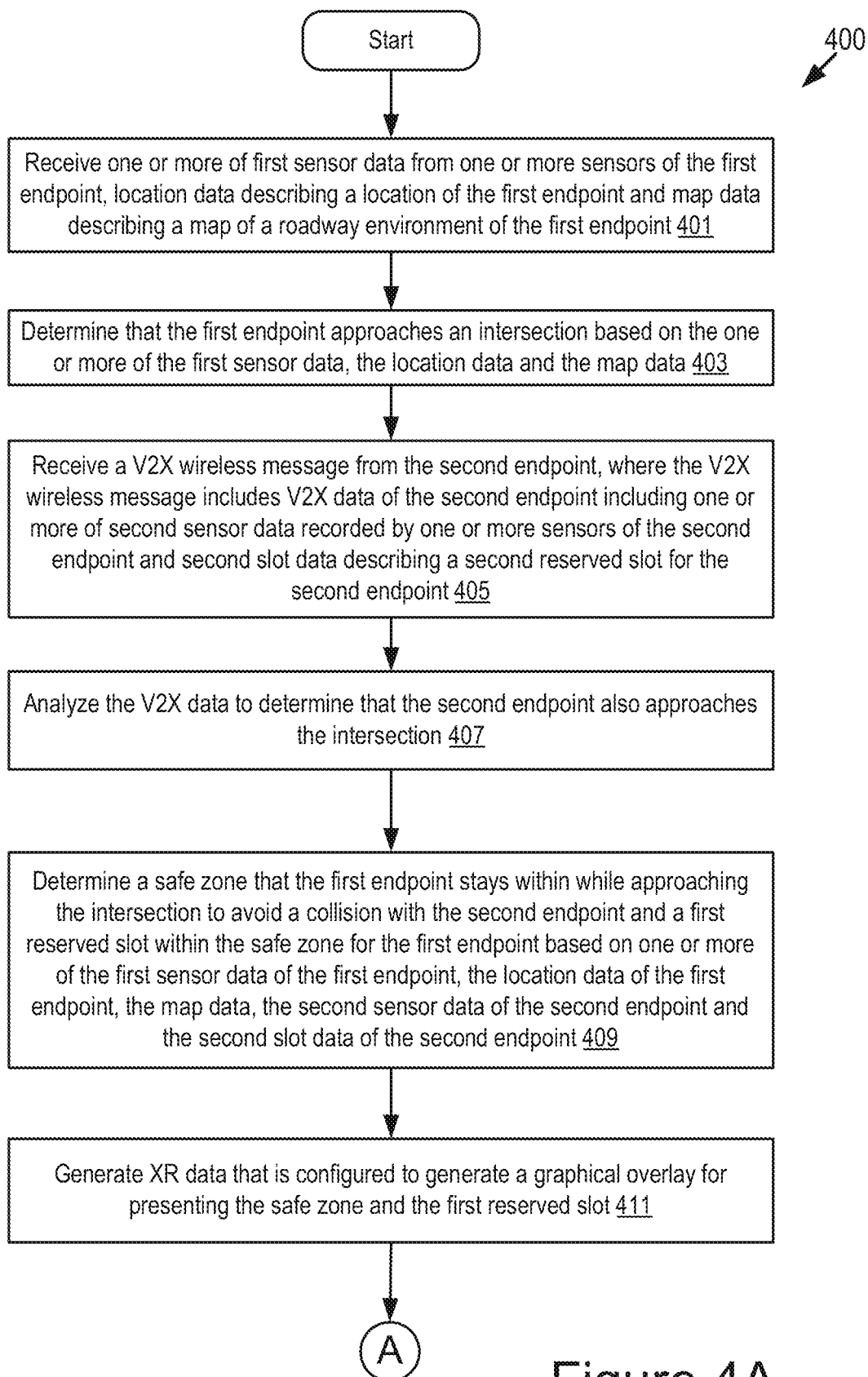
FIGS. 4A-4B depict another method for using XR technologies to improve safety of a first endpoint that travels through an intersection according to some embodiments.
Figure 4B:
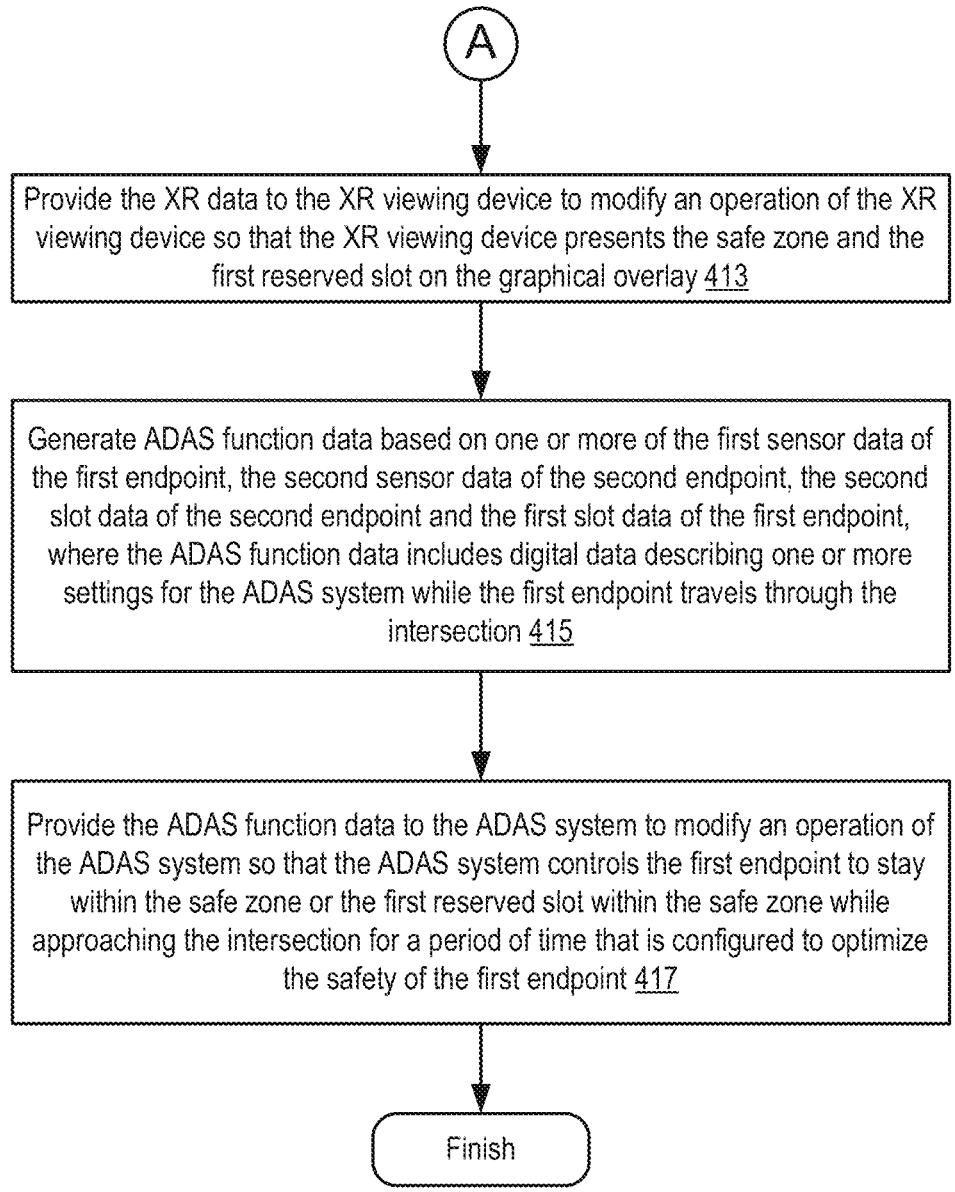

FIGS. 4A-4B depict another method 400 for using XR technologies to improve safety of the first endpoint 101 that travels through an intersection according to some embodiments. The steps of the method 400 are executable in any order, and not necessarily the order depicted in FIGS. 4A-4B. The method 400 may be executed by the first endpoint 101.

Referring to FIG. 4A, at step 401, the data collection module 204 receives one or more of first sensor data from one or more sensors of the first endpoint 101, location data describing a location of the first endpoint 101 and map data describing a map of a roadway environment of the first endpoint 101.

At step 403, the intersection module 206 determines that the first endpoint 101 approaches an intersection based on the one or more of the first sensor data, the location data and the map data.

At step 405, the data collection module 204 receives a V2X wireless message from the second endpoint 103, where the V2X wireless message includes V2X data of the second endpoint 103 including one or more of second sensor data recorded by one or more sensors of the second endpoint 103 and second slot data describing a second reserved slot for the second endpoint 103, etc.

At step 407, the intersection module 206 analyzes the V2X data to determine that the second endpoint 103 also approaches the intersection.

At step 409, the generation module 207 determines a safe zone that the first endpoint 101 stays within while approaching the intersection to avoid a collision with the second endpoint 103 and a first reserved slot within the safe zone for the first endpoint 101 based on one or more of the first sensor data of the first endpoint 101, the location data of the first endpoint 101, the map data, the second sensor data of the second endpoint 103 and the second slot data of the second endpoint 103.

At step 411, the generation module 207 generates XR data that is operable to generate a graphical overlay for presenting the safe zone and the first reserved slot.

Referring to FIG. 4B, at step 413, the presentation module 208 provides the XR data to the XR viewing device 184 to modify an operation of the XR viewing device 184 so that the XR viewing device 184 presents the safe zone and the first reserved slot on the graphical overlay.

At step 415, the ADAS modification module 210 generates ADAS function data based on one or more of the first sensor data of the first endpoint 101, the second sensor data of the second endpoint 103, the second slot data of the second endpoint 103 and the first slot data of the first endpoint 101, where the ADAS function data includes digital data describing one or more settings for the ADAS system 183 while the first endpoint 101 travels through the intersection.

At step 417, the ADAS modification module 210 provides the ADAS function data to the ADAS system 183 to modify an operation of the ADAS system 183 so that the ADAS system 183 controls the first endpoint 101 to stay within the safe zone or the first reserved slot within the safe zone while approaching the intersection for a period of time that is operable to optimize the safety of the first endpoint 101.

FIGS. 5A-5B are graphical representations 500 and 550 illustrating different types of intersections according to some embodiments. Referring to FIG. 5A, a stop-sign based intersection is shown. In FIG. 5B, a signalized intersection is depicted. It should be understood that the XR system 199 described herein can be applied for any type of intersections, including the intersections shown in FIGS. 5A-5B.

Figure 6:
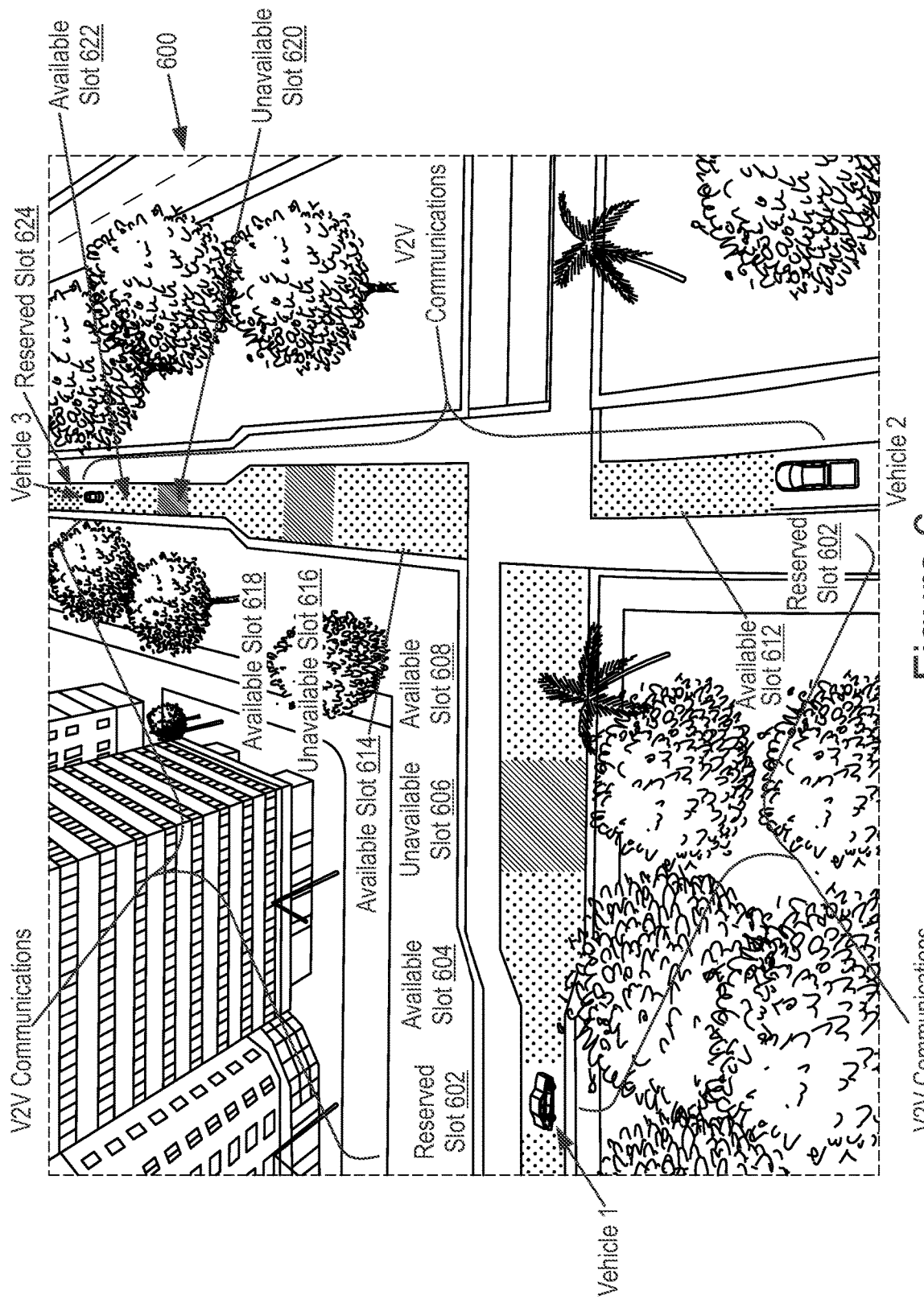
FIG. 6 is a graphical representation illustrating an example XR overlay for an intersection with stop signs according to some embodiments.

FIG. 6 is a graphical representation illustrating an example XR overlay 600 for a stop-sign based intersection (e.g., an intersection with stop signs) according to some embodiments. The XR overlay 600 may be presented to various drivers of various vehicles in a roadway environment near the intersection.

In the roadway environment near the intersection shown in FIG. 6, three vehicles (Vehicle 1, Vehicle 2 and Vehicle 3) approach the intersection from three different directions. The three vehicles may perform V2V communications with one another so that the data from the V2V communications can be used to estimate their respective time to arrive at the intersection. For example, it may take 5 seconds for Vehicle 1 to arrive at the intersection, 3 seconds for Vehicle 2 to arrive at the intersection and 8 seconds for Vehicle 3 to arrive at the intersection.

The example XR overlay 600 includes reserved slots where the vehicles should ideally be located, available slots where the vehicles may be located, and unavailable slots that may result in a collision or a high risk of collision (e.g., this may be a reserved slot for another vehicle). For example, Vehicle 1 is currently located in a reserved slot 602 that is designated for it. There are an available slot 604, an unavailable slot 606 and an available slot 608 ahead of the reserved slot 602 of Vehicle 1. A safe zone for Vehicle 1 may include the reserved slot 602, the available slot 604 and the available slot 608.

For example, Vehicle 2 is currently located in a reserved slot 610 that is designated for it. There is an available slot 612 ahead of the reserved slot 610 of Vehicle 2. A safe zone for Vehicle 2 may include the reserved slot 610 and the available slot 612.

For example, Vehicle 3 is currently located in a reserved slot 624 that is designated for it. There are an available slot 622, an unavailable slot 620, an available slot 618, an unavailable slot 616 and an available slot 614 ahead of the reserved slot 624 of Vehicle 3. A safe zone for Vehicle 3 may include the reserved slot 624 and the available slots 622, 618 and 614.

Figure 7:
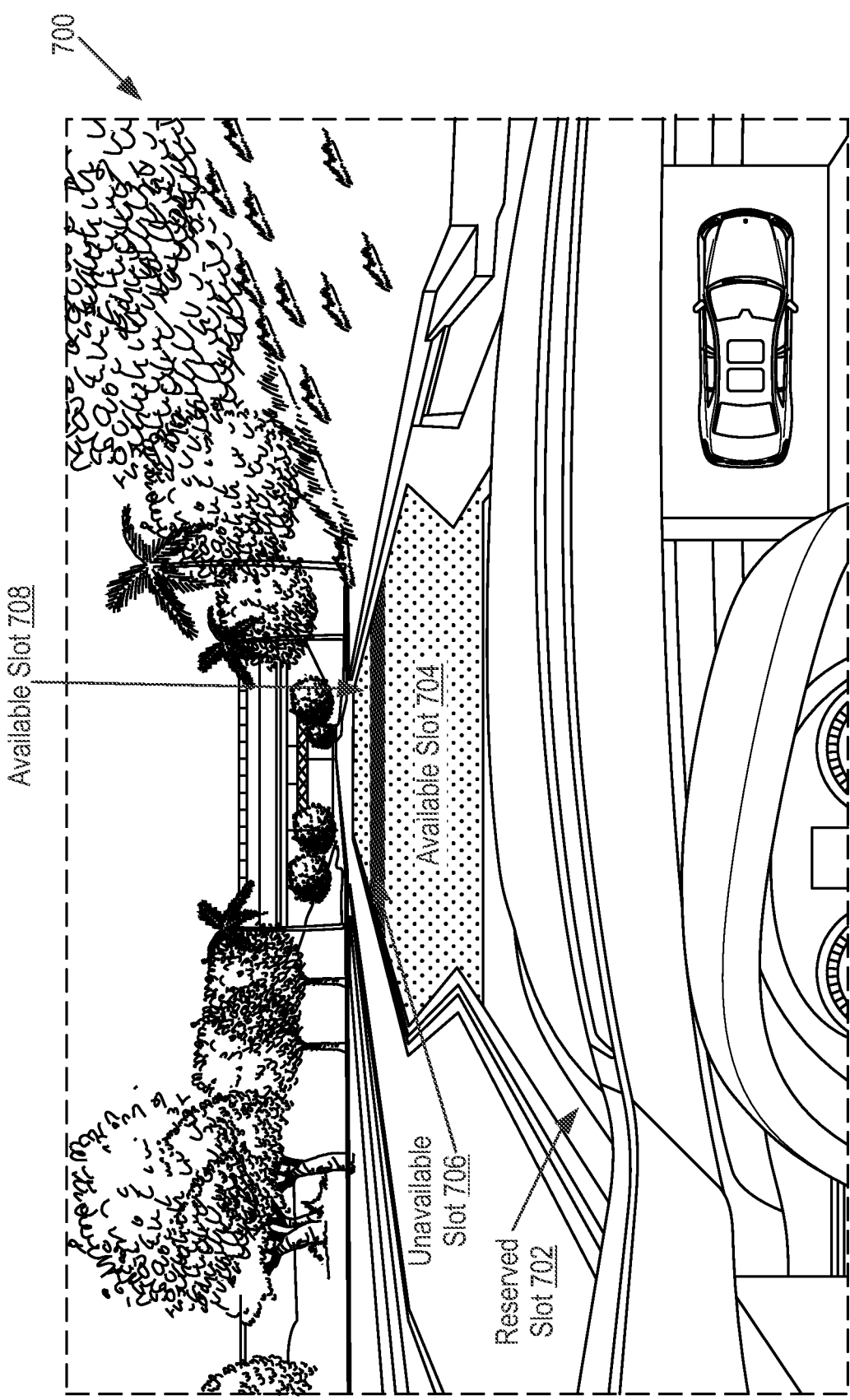
FIG. 7 is a graphical representation illustrating an example XR overlay for an intersection with stop signs from a perspective of a driver according to some embodiments.

FIG. 6 is not depicted form a perspective of a driver but is instead depicted as a roadway environment to show how the XR system 199 may operate for many different vehicles at the same time. FIG. 7 below shows a similar overlay from a perspective of a single driver of a vehicle.

FIG. 7 is a graphical representation illustrating an example XR overlay 700 for an intersection with stop signs from a perspective of a driver of a vehicle according to some embodiments. The vehicle is currently located in a reserved slot 702. There are an available slot 704, an unavailable slot 706 and an available slot 708 ahead of the reserved slot 702 of the vehicle. A safe zone for the vehicle may include the reserved slot 702 and the available slots 704 and 708.

The driver can just stay in the safe zone while approaching the intersection to avoid collision with other crossing vehicles and to avoid full stop at the intersection. For example, with the aid of the XR overlay 700, the driver knows to stay in the safe zone depicted in a 3D HUD of the vehicle and stay away from the unavailable slot 706.

As the vehicle travels towards the intersection, the reserved slot for the vehicle can be changed from the original reserved slot 702 to the available slot 704 and then to the available slot 708. In this case, the reserved slot for the vehicle changes over time.

Figure 8:
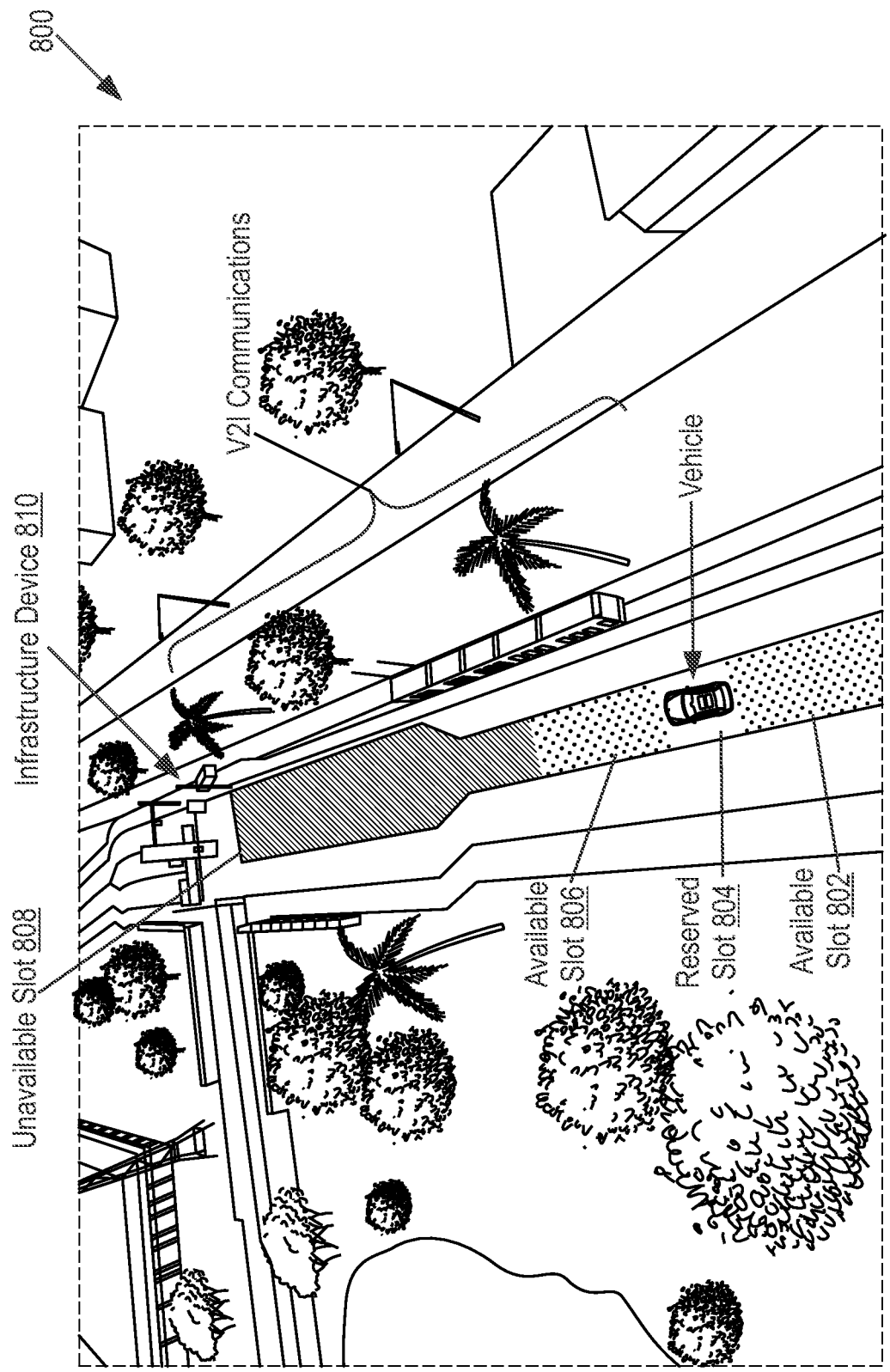
FIG. 8 is a graphical representation illustrating an example XR overlay for an intersection with traffic lights according to some embodiments.

FIG. 8 is a graphical representation illustrating an example XR overlay 800 for a signalized intersection (e.g., an intersection with traffic lights) according to some embodiments. The XR overlay 800 may be presented to various drivers of various vehicles in a roadway environment near the intersection.

In the roadway environment near the intersection shown in FIG. 8, a vehicle approaches the intersection. The vehicle may perform V2I communications with an infrastructure device 810 (e.g., a traffic light infrastructure device) to obtain a signal phase and timing information of the traffic signals. For example, from the V2I communications, the vehicle may know that a current red window has 6 seconds left and a next green window has a length of 30 seconds.

The example XR overlay 800 includes a reserved slot 804 where the vehicle should ideally be located, available slots 802 and 806 where the vehicle may be located, and an unavailable slot 808 that may result in a collision or a high risk of collision (e.g., this may be a reserved slot for another vehicle). For example, the vehicle is currently located in the reserved slot 804. A safe zone for the vehicle may include the reserved slot 804 and the available slots 802 and 806.

Figure 9:
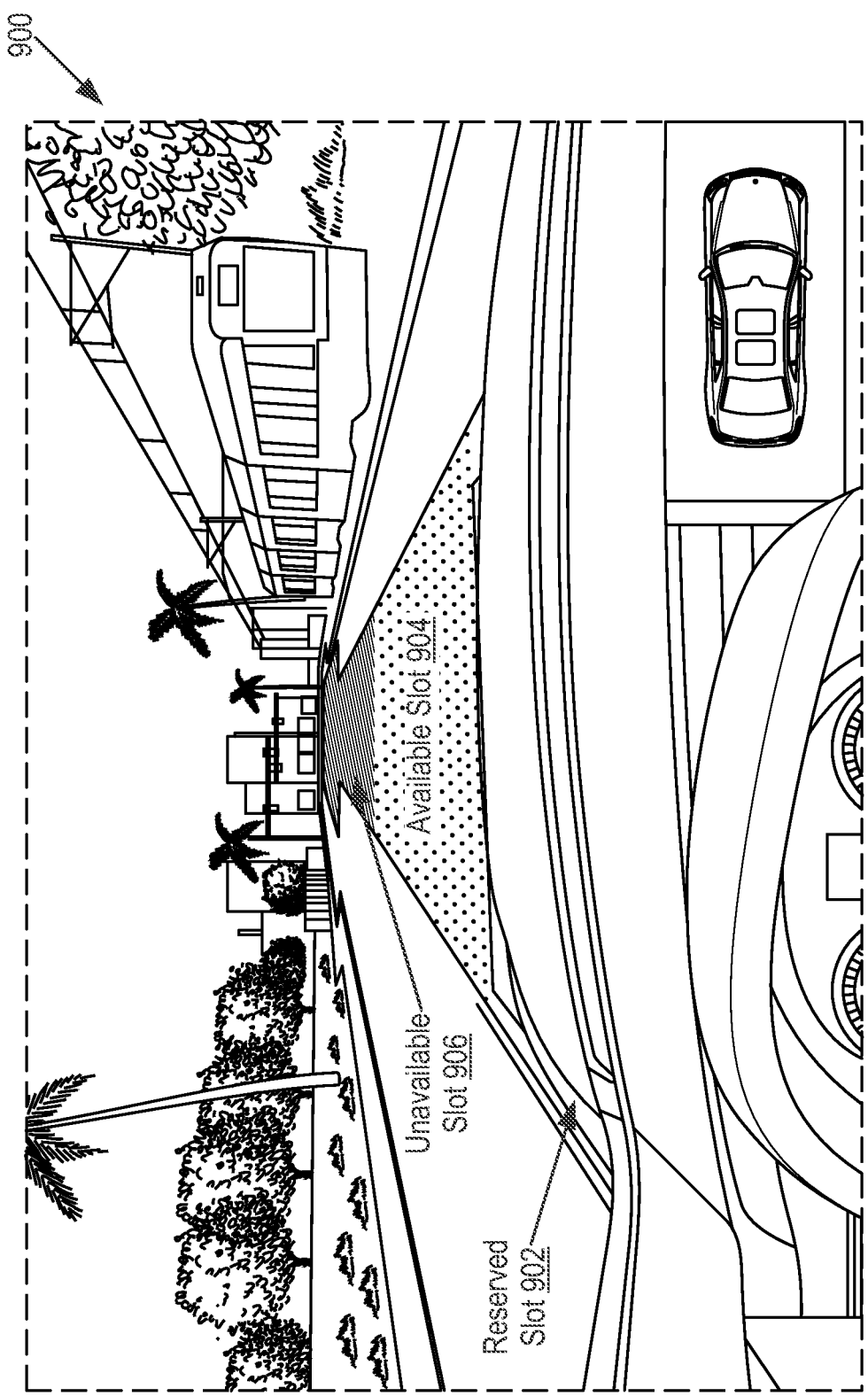
FIG. 9 is a graphical representation illustrating an example XR overlay for an intersection with traffic lights from a perspective of a driver according to some embodiments.

FIG. 8 is not depicted form a perspective of a driver but is instead depicted as a roadway environment to show how the XR system 199 may operate for many different vehicles at the same time. FIG. 9 below shows a similar overlay from a perspective of a single driver of a vehicle.

FIG. 9 is a graphical representation illustrating an example XR overlay 900 for a signalized intersection (e.g., an intersection with traffic lights) from a perspective of a driver according to some embodiments. The vehicle is currently located in a reserved slot 902. There are an available slot 904 and an unavailable slot 906 ahead of the reserved slot 902 of the vehicle. A safe zone for the vehicle may include the reserved slot 902 and the available slot 904.

The driver can just stay in the safe zone while approaching the intersection to avoid full stop at the intersection. For example, with the aid of the XR overlay 900, the driver knows to stay in the safe zone depicted in a 3D HUD of the vehicle and stay away from the unavailable slot 906.

As the vehicle travels towards the intersection, the reserved slot for the vehicle can be changed from the original reserved slot 902 to the available slot 904 such that the reserved slot for the vehicle changes over time.

FIG. 10 is a block diagram illustrating an example structure 1000 of the XR viewing device 184 according to some embodiments. Here, the XR viewing device 184 is a 3D-HUD.

The 3D HUD includes a projector 1001, a movable screen 1002, a screen-driving unit 1003, an optical system (including lenses 1004, 1006, reflector 1005, etc.). The projector 1001 may be any kind of projector such as a digital mirror device (DMD) project, a liquid crystal projector. The projector 1001 projects an image (graphic) 1008 on the movable screen 1002. The image 1008 may include a virtual object. For example, the image 1008 may depict the available slots, the unavailable slots and the reserved slots shown in FIGS. 6-9 so that the driver can view the available slots, the unavailable slots and the reserved slots using the 3D HUD.

The movable screen 1002 includes a transparent plate and so the light of the projected image transmits through the movable screen 1002 to be projected on the windshield 1007 of a vehicle (e.g., the ego vehicle 123). The image projected on the windshield 1007 is perceived by a driver 1010 as if it is a real object (shown as 1011*a*, 1011*b*) that exists in the three-dimensional space of the real-world, as opposed to an object that is projected on the windshield.

The 3D HUD is capable of controlling the direction of the image relative to the driver 1010 (in other words, the image position in the windshield) by adjusting the projection position on the screen 1002. Further the screen 1002 is movable by the screen-driving unit 1003 in the range between the positions 1003*a* and 1003*b*. Adjusting the position of the screen 1002 can vary the depth (distance) of the projected image from the driver 1010 in the real-world. In one example, the movable range of the screen 1002 (distance between positions 1003*a* and 1003*b*) may be 5 mm, which correspond to from 5 m away to infinity in the real-world. The use of the 3D HUD allows the driver 1010 to perceive the projected image exist in the real-world (three-dimensional space). For example, when an image is projected at the same three-dimensional position (or substantially same depth at least) as a real object (such as a roadway lines), the driver does not need to adjust eye focus in order to view the projected image, resulting in easy grasp of the projected image while looking at the real object.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method for a first endpoint, comprising:
receiving first sensor data from one or more sensors of the first endpoint;
determining that the first endpoint approaches an intersection based on the first sensor data;
generating, based on the first sensor data, cross reality (XR) data that is operable to generate a graphical overlay for presenting a safe zone that the first endpoint stays within while approaching the intersection to improve safety of the first endpoint and first slot data describing a first reserved slot within the safe zone that is reserved for the first endpoint;
providing the XR data to an XR viewing device to modify an operation of the XR viewing device so that the XR viewing device presents the first reserved slot within the safe zone on the graphical overlay; and
providing a first position of the first reserved slot within the safe zone to a second endpoint so that the second endpoint does not enter the safe zone, wherein the first position changes over time.

2. The method of claim 1, wherein determining that the first endpoint approaches the intersection comprises:
receiving one or more of location data describing a location of the first endpoint or map data describing a map of a roadway environment of the first endpoint; and
determining that the first endpoint approaches the intersection based on one or more of the first sensor data, the location data, or the map data.

3. The method of claim 1, further comprising:
receiving a second position of a second reserved slot from a second endpoint; and
determining the first reserved slot for the first endpoint based on the second reserved slot.

4. The method of claim 1, further comprising determining the first reserved slot for the first endpoint based on an available slot in the safe zone that is closest to the intersection, an available slot in the safe zone that is closest to a current location of the first endpoint, or an available slot in the safe zone that reduces a travel time of the first endpoint through the intersection.

5. The method of claim 1, wherein generating the XR data comprises:
receiving a Vehicle-to-Everything (V2X) wireless message from a second endpoint, wherein the V2X wireless message includes V2X data of the second endpoint including one or more of second sensor data recorded by one or more sensors of the second endpoint and second slot data describing a second reserved slot for the second endpoint;
receiving one or more of location data describing a location of the first endpoint and map data describing a map of a roadway environment of the first endpoint; and
generating the XR data based on one or more of the first sensor data of the first endpoint, the location data of the first endpoint, the map data, the second sensor data of the second endpoint and the second slot data of the second endpoint.

6. The method of claim 5, wherein generating the XR data further comprises:
analyzing the V2X data to determine that the second endpoint also approaches the intersection;
determining the safe zone and the first reserved slot within the safe zone for the first endpoint to avoid a collision with the second endpoint based on one or more of the first sensor data of the first endpoint, the location data of the first endpoint, the map data, the second sensor data of the second endpoint and the second slot data of the second endpoint; and generating the XR data that is operable to generate the graphical overlay for presenting the safe zone and the first reserved slot.

7. The method of claim 5, wherein the first endpoint includes an Advanced Driver Assistance System (ADAS system), and the method further comprises:

generating ADAS function data based on one or more of the first sensor data of the first endpoint, the second sensor data of the second endpoint, the second slot data of the second endpoint and the first slot data of the first endpoint, wherein the ADAS function data includes digital data describing one or more settings for the ADAS system while the first endpoint travels through the intersection; and providing the ADAS function data to the ADAS system to modify an operation of the ADAS system so that the ADAS system controls the first endpoint to stay within the safe zone or the first reserved slot within the safe zone while approaching the intersection for a period of time that is operable to optimize the safety of the first endpoint.

8. The method of claim 3, wherein the safe zone and the first reserved slot are color-coded within the graphical overlay to facilitate a recognition of the safe zone and the first reserved slot by a user of the first endpoint.

9. A system comprising:

an onboard computer system of a first endpoint including a non-transitory memory storing computer code which, when executed by the onboard computer system, causes the onboard computer system to:

receive first sensor data from one or more sensors of the first endpoint;

determine that the first endpoint approaches an intersection based on the first sensor data;

generate, based on the first sensor data, cross reality (XR) data that is operable to generate a graphical overlay for presenting a safe zone that the first endpoint stays within while approaching the intersection to improve safety of the first endpoint and first slot data describing a first reserved slot within the safe zone that is reserved for the first endpoint;

provide the XR data to an XR viewing device to modify an operation of the XR viewing device so that the XR viewing device presents the first reserved slot within the safe zone on the graphical overlay; and provide a first position of the first reserved slot within the safe zone to a second endpoint so that the second endpoint does not enter the safe zone, wherein the first position changes over time.

10. The system of claim 9, wherein the computer code, when executed by the onboard computer system, causes the onboard computer system to determine that the first endpoint approaches the intersection at least by:

receiving one or more of location data describing a location of the first endpoint or map data describing a map of a roadway environment of the first endpoint; and determining that the first endpoint approaches the intersection based on one or more of the first sensor data, the location data, or the map data.

11. The system of claim 9, wherein the computer code, when executed by the onboard computer system further causes the computer system to:

receive a second position of a second reserved slot from a second endpoint; and determine the first reserved slot for the first endpoint based on the second reserved slot.

12. The system of claim 9, wherein the computer code, when executed by the onboard computer system, causes the onboard computer system to determine the first reserved slot for the first endpoint based on an available slot in the safe zone that is closest to the intersection, an available slot in the safe zone that is closest to a current location of the first endpoint, or an available slot in the safe zone that reduces a travel time of the first endpoint through the intersection.

13. The system of claim 9, wherein the computer code, when executed by the onboard computer system, causes the onboard computer system to generate the XR data at least by:

receiving a Vehicle-to-Everything (V2X) wireless message from a second endpoint, wherein the V2X wireless message includes V2X data of the second endpoint including one or more of second sensor data recorded by one or more sensors of the second endpoint and second slot data describing a second reserved slot for the second endpoint;

receiving one or more of location data describing a location of the first endpoint and map data describing a map of a roadway environment of the first endpoint; and generating the XR data based on one or more of the first sensor data of the first endpoint, the location data of the first endpoint, the map data, the second sensor data of the second endpoint and the second slot data of the second endpoint.

14. The system of claim 13, wherein the computer code, when executed by the onboard computer system, causes the onboard computer system to generate the XR data at least by:

analyzing the V2X data to determine that the second endpoint also approaches the intersection;

determining the safe zone and the first reserved slot within the safe zone for the first endpoint to avoid a collision with the second endpoint based on one or more of the first sensor data of the first endpoint, the location data of the first endpoint, the map data, the second sensor data of the second endpoint and the second slot data of the second endpoint; and generating the XR data that is operable to generate the graphical overlay for presenting the safe zone and the first reserved slot.

15. The system of claim 13, wherein the first endpoint includes an Advanced Driver Assistance System (ADAS system), and the computer code, when executed by the onboard computer system, causes the onboard computer system further to:

generate ADAS function data based on one or more of the first sensor data of the first endpoint, the second sensor data of the second endpoint, the second slot data of the second endpoint and the first slot data of the first endpoint, wherein the ADAS function data includes digital data describing one or more settings for the ADAS system while the first endpoint travels through the intersection; and provide the ADAS function data to the ADAS system to modify an operation of the ADAS system so that the ADAS system controls the first endpoint to stay within the safe zone or the first reserved slot within the safe zone while approaching the intersection for a period of time that is operable to optimize the safety of the first endpoint.

16. The system of claim 11, wherein the safe zone and the first reserved slot are color-coded within the graphical overlay to facilitate a recognition of the safe zone and the first reserved slot by a user of the first endpoint.

17. A computer program product comprising a non-transitory memory of an onboard computer system of a first endpoint storing computer-executable code that, when executed by a processor, causes the processor to:
receive first sensor data from one or more sensors of the first endpoint;
determine that the first endpoint approaches an intersection based on the first sensor data;
generate, based on the first sensor data, cross reality (XR) data that is operable to generate a graphical overlay for presenting a safe zone that the first endpoint stays within while approaching the intersection to improve safety of the first endpoint and first slot data describing a first reserved slot within the safe zone that is reserved for the first endpoint;
provide the XR data to an XR viewing device to modify an operation of the XR viewing device so that the XR viewing device presents the first reserved slot within the safe zone on the graphical overlay; and
provide a first position of the first reserved slot within the safe zone to a second endpoint so that the second endpoint does not enter the safe zone, wherein the first position changes over time.

18. The computer program product of claim 17, wherein the computer-executable code, when executed by the processor, causes the processor to:
receive a second position of a second reserved slot from a second endpoint; and
determine the first reserved slot for the first endpoint based on the second reserved slot.

19. The computer program product of claim 17, wherein the computer-executable code, when executed by the processor, causes the processor to generate the XR data at least by:
receiving a Vehicle-to-Everything (V2X) wireless message from a second endpoint, wherein the V2X wireless message includes V2X data of the second endpoint including one or more of second sensor data recorded by one or more sensors of the second endpoint and second slot data describing a second reserved slot for the second endpoint;
receiving one or more of location data describing a location of the first endpoint and map data describing a map of a roadway environment of the first endpoint; and
generating the XR data based on one or more of the first sensor data of the first endpoint, the location data of the first endpoint, the map data, the second sensor data of the second endpoint and the second slot data of the second endpoint.

20. The computer program product of claim 19, wherein the first endpoint includes an Advanced Driver Assistance System (ADAS system), and the computer-executable code, when executed by the processor, causes the processor further to:
generate ADAS function data based on one or more of the first sensor data of the first endpoint, the second sensor data of the second endpoint, the second slot data of the second endpoint and the first slot data of the first endpoint, wherein the ADAS function data includes digital data describing one or more settings for the ADAS system while the first endpoint travels through the intersection; and
provide the ADAS function data to the ADAS system to modify an operation of the ADAS system so that the ADAS system controls the first endpoint to stay within the safe zone or a first reserved slot within the safe zone while approaching the intersection for a period of time that is operable to optimize the safety of the first endpoint.

* * * * *